(12) United States Patent
Evans

(10) Patent No.: US 7,282,149 B2
(45) Date of Patent: Oct. 16, 2007

(54) PROCESS FOR IN SITU BIOREMEDIATION OF SUBSURFACE CONTAMINANTS

(75) Inventor: Patrick J Evans, Seattle, WA (US)

(73) Assignee: Camp Dresser & McKee Inc., Cambridge, MA (US)

( * ) Notice: Subject to any disclaimer, the term of this patent is extended or adjusted under 35 U.S.C. 154(b) by 4 days.

(21) Appl. No.: 11/447,669

(22) Filed: Jun. 6, 2006

(65) Prior Publication Data

US 2006/0263869 A1    Nov. 23, 2006

Related U.S. Application Data

(63) Continuation of application No. PCT/US04/40013, filed on Nov. 30, 2004.

(60) Provisional application No. 60/528,803, filed on Dec. 11, 2003, provisional application No. 60/530,863, filed on Dec. 18, 2003, provisional application No. 60/533,585, filed on Dec. 31, 2003.

(51) Int. Cl.
*C02F 3/00* (2006.01)

(52) U.S. Cl. ..................................... 210/610

(58) Field of Classification Search ................ 210/610
See application file for complete search history.

(56) References Cited

U.S. PATENT DOCUMENTS

| 5,480,549 A | 1/1996 | Looney et al. |
|---|---|---|
| 6,488,850 B2 | 12/2002 | Perriello |
| 6,562,235 B1 | 5/2003 | Newell et al. |
| 2001/0023847 A1 | 9/2001 | Perriello |
| 2003/0034301 A1 | 2/2003 | Perriello |
| 2003/0044966 A1 | 3/2003 | Perriello |
| 2003/0062306 A1 | 4/2003 | Perriello |
| 2003/0136735 A1 | 7/2003 | Perriello |

FOREIGN PATENT DOCUMENTS

| CA | 2 426 216 A1 | 10/2003 |
|---|---|---|
| WO | WO 03/083260 A1 | 10/2003 |

*Primary Examiner*—Chester T. Barry
(74) *Attorney, Agent, or Firm*—Hamilton, Brook, Smith & Reynolds, P.C.

(57) ABSTRACT

This invention includes methods of stimulating anaerobic degradation of subsurface contaminants. The methods include vaporizing a liquid electron donor to form a treating gas. The treating gas or hydrogen is directed to a subsurface site that includes one or more contaminants, thereby stimulating anaerobic degradation of the subsurface contaminants.

65 Claims, 24 Drawing Sheets

| Test | Repli-cates | Electron Donor | Moisture | Nutrients | Soil (g) | 0.97 g/L (NH4)2HPO4 (mL) | 4.85 g/L (NH4)2HPO4 (mL) | Denatured Ethanol (μL) | 10/5/85 H2/CO2/N2 (mL) | H2 (mL) | Water (mL) |
|---|---|---|---|---|---|---|---|---|---|---|---|
| 1 | 2 | None | Low | No | 20 | 0 | 0 | 0 | 0 | 0 | 0.2 |
| 2 | 2 | H2/CO2 | Low | No | 20 | 0 | 0 | 0 | 7.25 | 0.725 | 0.2 |
| 3 | 2 | Ethanol | Low | No | 20 | 0 | 0 | 1 | 0 | 0 | 0.2 |
| 4 | 2 | None | High | No | 20 | 0 | 0 | 0 | 0 | 0 | 1 |
| 5 | 2 | H2/CO2 | High | No | 20 | 0 | 0 | 0 | 7.25 | 0.725 | 1 |
| 6 | 2 | Ethanol | High | No | 20 | 0 | 0 | 1 | 0 | 0 | 1 |
| 7 | 2 | None | Low | Yes | 20 | 0 | 0.2 | 0 | 0 | 0 | 0 |
| 8 | 2 | H2/CO2 | Low | Yes | 20 | 0 | 0.2 | 0 | 7.25 | 0.725 | 0 |
| 9 | 2 | Ethanol | Low | Yes | 20 | 0 | 0.2 | 1 | 0 | 0 | 0 |
| 10 | 2 | None | High | Yes | 20 | 1 | 0 | 0 | 0 | 0 | 0 |
| 11 | 2 | H2/CO2 | High | Yes | 20 | 1 | 0 | 0 | 7.25 | 0.725 | 0 |
| 12 | 2 | Ethanol | High | Yes | 20 | 1 | 0 | 1 | 0 | 0 | 0 |

FIG. 2

Vadose Zone Soil Microcosm Results Demonstrating Perchlorate Removal Using Different Electron Donors And Different Moisture Contents

| Soil Moisture | Electron Donor | Perchlorate (µg/kg) | |
|---|---|---|---|
| | | Initial | Final |
| 12% | Control | 37300 | 37700 |
| 12% | Acetic acid | 37300 | ND |
| 12% | Methanol | 37300 | 16900 |
| 12% | Propane | 37300 | 37938 |
| 12% | Propionic acid | 37300 | ND |
| 9.50% | Hydrogen/carbon dioxide | 37300 | 26400 |
| 12% | Hydrogen/carbon dioxide | 37300 | ND |
| 9.50% | Ethanol | 37300 | 220 |
| 12% | Ethanol | 37300 | ND |

FIG. 20

Transport Rates Of Gaseous Electron Donors Through Columns Of Moist Soil

| Electron Donor | Henry's Constant (atm-m³/mol) | Solubility (g/100 g H$_2$O) | Log Koc mL/g | Psat[1] mm HG | Vapor Velocity (in/day) | |
|---|---|---|---|---|---|---|
| | | | | | Average | Std Dev |
| Butyl acetate | 3.33E-04 | 0.7 | 1.82 | 10 (20) | 2.9 | 2.0 |
| Ethanol | 5.00E-06 | Miscible | -0.31 | 40 (19) | 3.2 | 1.9 |
| Butyraldehyde | 1.20E-04 | 4 | 1.18 | 91.5 (20) | 24 | 17 |
| Ethyl acetate | 1.40E-04 | 8.5 | 0.73 | 60 (16.6) | 24 | 16 |
| Hydrogen | 1.28E+00 | 0.00016 | 0 | NA | 4000[2] | NA |

(1) Number in parenthesis is reference temperature in degrees Centigrade.
(2) Based on bulk gas velocity.

FIG. 23

PROCESS FOR IN SITU BIOREMEDIATION OF SUBSURFACE CONTAMINANTS

RELATED APPLICATIONS

This application is a continuation of International Application No. PCT/US2004/040013, which designated the United States and was filed on Nov. 30, 2004, published in English, which claims the benefit of U.S. Provisional Application No. 60/533,585, filed on Dec. 31, 2003, claims the benefit of U.S. Provisional Application No. 60/530,863, filed on Dec. 18, 2003, and claims the benefit of U.S. Provisional Application No. 60/528,803, filed on Dec. 11, 2003. The entire teachings of the above applications are incorporated herein by reference.

BACKGROUND OF THE INVENTION

Subsurface contamination of soil, groundwater, and perched water has become a concern because such contamination has been associated with a number of detrimental health risks. Subsurface contamination that includes perchlorate salts is a particular concern because the salts are soluble in water and capable of being transported long distances in underground aquifers. The U.S. Environmental Protection Agency has proposed a maximum contaminant level (MCL) for perchlorates of about 1 part per billion in water.

Perchlorate present in soil can leach into groundwater, and infiltrating storm water can increase the size of a contamination area. Several perchlorate plumes in California are believed to measure miles in length. Hence, perchlorate contamination of soil overlying groundwater is of particular concern. Continuing contamination of groundwater by perchlorate sources in soil can result in the need to treat groundwater for extended time periods at a much greater cost. It is believed that treatment of perchlorate sources in soil will result in faster cleanup of groundwater and decrease costs.

Various approaches for treating contaminated ground water have been developed. Ex situ treatment methods usually involve removing some portion of contaminated ground water, treating it, and reintroducing the treated water to the subsurface. Examples of ex situ treatment processes include ion exchange, anaerobic biological treatment, reverse osmosis, and tailored activated carbon adsorption.

A more limited range of in situ treatment methods have been developed such as, for example, anaerobic biological treatment. In situ anaerobic biological treatment has generally been conducted two different ways. The first method involves injecting a liquid electron donor into the groundwater. An electron donor is a chemical capable of donating electrons to bacteria to assist the bacteria in biologically reducing contaminants to innocuous byproducts. One problem with this approach is that dispersion of injected liquid electron donors is limited and requires the use of closely spaced injection points. A second method involves extracting groundwater, mixing the extracted groundwater with liquid electron donors, and then re-injecting the groundwater with the liquid electron donor. One problem with this second approach is that pumping costs for groundwater can be high and the wells and equipment can be biofouled by the injected liquid electron donor.

A variety of techniques have also been developed for treating contamination of shallow soil. In one method, the contaminated shallow soil is simply excavated and disposed in a landfill. It has been discovered that some microbial species (e.g., some bacterial species) are able to utilize some contaminants in various metabolic processes (e.g., anaerobic processes). These processes can be stimulated by introducing an electron-donating material into the subsurface. Some in situ and ex situ anaerobic biological treatment methods have also been developed, however, these are limited to shallow soils and use liquid or solid electron donors that are difficult to deliver in situ.

Previous techniques for treating contamination of deep soil are extremely limited and have not been successful. One example includes the percolation of liquid electron donors to deep soil, but these methods have been limited by channeling of the liquid electron donors through the soil and incomplete contact between electron donor, the contaminant, and bacteria. Other examples of remediation techniques for deep soil include in situ thermal treatment, aerobic biological treatment or bioventing, and soil vapor extraction; however, these techniques are not very effective at treating perchlorate contamination. Thermal treatment of deep soil perchlorate contamination is not very effective as perchlorates are stable at typical thermal treatment temperatures. Aerobic biological treatment or aerobic bioventing is not an effective approach as perchlorates are more effectively degraded under anaerobic conditions. Also, perchlorates are usually not volatile, so soil vapor extraction is not applicable to perchlorates.

In addition to perchlorates, nitrate subsurface contamination is also a concern. While nitrates are not of as much concern as perchlorates, nitrate contamination is more widespread because it is commonly used to fertilize crops and grass. Other contaminants of concern are halogenated volatile organic compounds.

Previous work by the U.S. Engineer Research and Development Center (ERDC) demonstrated that the gaseous electron donor isobutyl acetate promoted biodegradation of trinitrobenzene also called TNB (Rainwater, et al., *Design, Construction, and Operation of a Field Demonstration for In Situ Biodegradation of Vadose Zone Soils Contaminated With High Explosives*, ENVIRONMENTAL LABORATORY ERDC/EL TR-01-28 (September 2001)). Rainwater, et al. tested other gaseous electron donors including ethanol, acetone, and acetic acid, but those donors did not promote biodegradation of RDX and TNB compared to the nitrogen-only control. Only nitrogen gas alone was shown to promoted biodegradation of RDX and TNB. The data presented by Rainwater, et al. indicated that gaseous electron donor addition is poor technology for remediation of RDX and TNB and is limited to the exclusive use of isobutyl acetate for the remediation of TNB.

A need exists, therefore, for better methods of treating subsurface contaminants (e.g., perchlorates, nitrates, and halogenated volatile organic compounds) in situ.

SUMMARY OF THE INVENTION

This invention includes improved methods for in situ anaerobic bioremediation of subsurface contaminants (e.g., perchlorates, nitrates, and halogenated volatile organic compounds).

In one embodiment, this invention is a method of stimulating anaerobic degradation of subsurface contaminants. The method comprises the steps of vaporizing an electron donor to form an electron donor gas, mixing the electron donor gas with a carrier gas to form a treating gas with an electron donor component, and directing the treating gas to a subsurface injection site. The electron donor is a liquid at a temperature of 0° C. and a pressure of 1 atmosphere and the subsurface injection site includes at least one contaminant (e.g., a perchlorate compound). The treating gas stimulates anaerobic degradation of at least a portion of the contaminant.

In another embodiment, this invention is a method of stimulating anaerobic degradation of subsurface perchlorate contamination. The method comprises the steps of vaporizing an electron donor to form an electron donor gas, mixing the electron donor gas with a carrier gas to form a treating gas with an electron donor component, and directing the treating gas to a subsurface injection site. The electron donor is a liquid at a temperature of 0° C. and a pressure of 1 atmosphere and includes at least one member of the group consisting of an aldehyde, an alkene, an alkyne, an amine, an aromatic hydrocarbon, an ester, a ketone, an organic acid, ethyl acetate, methanol, ethanol, propanol, butanol, and isomers thereof. The subsurface injection site includes at least one contaminant (e.g., a perchlorate contaminant). The treating gas stimulates anaerobic degradation of at least a portion of the perchlorate contamination.

In yet another embodiment, this invention is a method of stimulating anaerobic degradation of subsurface contaminants, comprising the steps of vaporizing an electron donor to form an electron donor gas, mixing the electron donor gas with a carrier gas to form a treating gas with an electron donor component, and directing the treating gas to a subsurface injection site. The electron donor is a liquid at a temperature of 0° C. and a pressure of 1 atmosphere and the amount of liquid electron donor gas mixed with the carrier gas is controlled to prevent the electron donor component from condensing before the treating gas reaches the subsurface injection site. The subsurface injection site includes at least one contaminant and the treating gas stimulates anaerobic degradation of at least a portion of the contaminant.

In another embodiment, this invention is a method for stimulating anaerobic degradation of subsurface perchlorate contaminants, comprising the step of directing hydrogen gas to a subsurface site. The subsurface site includes at least one perchlorate contaminant and the hydrogen gas stimulates anaerobic degradation of at least a portion of the perchlorate contaminant.

In one embodiment, this invention is a method of stimulating anaerobic degradation of subsurface perchlorate contamination. The method comprises the steps of vaporizing liquid ethanol to form ethanol gas; mixing the ethanol gas with a carrier gas to form a treating gas that includes from about 0.1% to about 2.5% ethanol gas by volume; and directing the treating gas to a subsurface injection site. The subsurface injection site includes at least one perchlorate contaminant and the treating gas stimulates anaerobic degradation of at least a portion of the perchlorate contamination.

In another embodiment, this invention is a method of stimulating anaerobic degradation of subsurface perchlorate contamination, comprising the steps of vaporizing liquid methanol to form methanol gas; mixing the methanol gas with a carrier gas to form a treating gas that includes from about 0.1% to about 7% methanol gas by volume; and directing the treating gas to a subsurface injection site. The subsurface injection site includes at least one perchlorate contaminant and the treating gas stimulates anaerobic degradation of at least a portion of the perchlorate contamination.

In one embodiment, this invention is a method of stimulating anaerobic degradation of subsurface perchlorate contamination. The method comprises the steps of vaporizing liquid ethyl acetate to form ethyl acetate gas; mixing the ethyl acetate gas with a carrier gas to form a treating gas that includes from about 0.1% to about 4% ethyl acetate gas by volume; and directing the treating gas to a subsurface injection site. The subsurface injection site includes at least one perchlorate contaminant and the treating gas stimulates anaerobic degradation of at least a portion of the perchlorate contamination.

In one embodiment, this invention is a method of stimulating anaerobic degradation of subsurface perchlorate contamination. The method comprises the steps of vaporizing liquid hexene to form hexene gas gas; mixing the hexene gas with a carrier gas to form a treating gas that includes from about 0.1% to about 6.5% hexene gas by volume; and directing the treating gas to a subsurface injection site. The subsurface injection site includes at least one perchlorate contaminant and the treating gas stimulates anaerobic degradation of at least a portion of the perchlorate contamination.

This invention provides methods for the in situ treatment of a wide range of subsurface contaminants, including perchlorates, nitrates, and halogenated organic compounds. The methods of this invention include the use of electron donors in a vapor phase, which provides for a wide dispersion of the electron donors to a subsurface application point.

This invention provides for the treatment of contaminated soil (e.g., contaminated soil in the vadose zone), groundwater, and perched water, including treatment of deep soil and perched water. The methods of the invention eliminate the need for costly pumping of groundwater and reduce the risk of biofouling of wells and equipment. This invention also does not require copious amounts of energy as are needed in thermal treatment methods.

This invention provides for dispersion of a vaporized electron donor (e.g., esters, alkenes, ketones, and/or alcohols). Using esters, alkenes, ketones, and alcohols as electron donors is advantageous because these chemicals are efficient in stimulating anaerobic nitrate and perchlorate degradation and using them in the gas phase provides for better dispersion in the subsurface.

BRIEF DESCRIPTION OF THE DRAWINGS

FIG. 2 illustrates a table summarizing twelve test conditions.

FIG. 20 illustrates a table of perchlorate removal under different electron donor and moisture conditions.

FIG. 23 illustrates a table of gaseous electron donor physical properties and transport rates through moist soil.

DETAILED DESCRIPTION OF THE INVENTION

Figure 1:
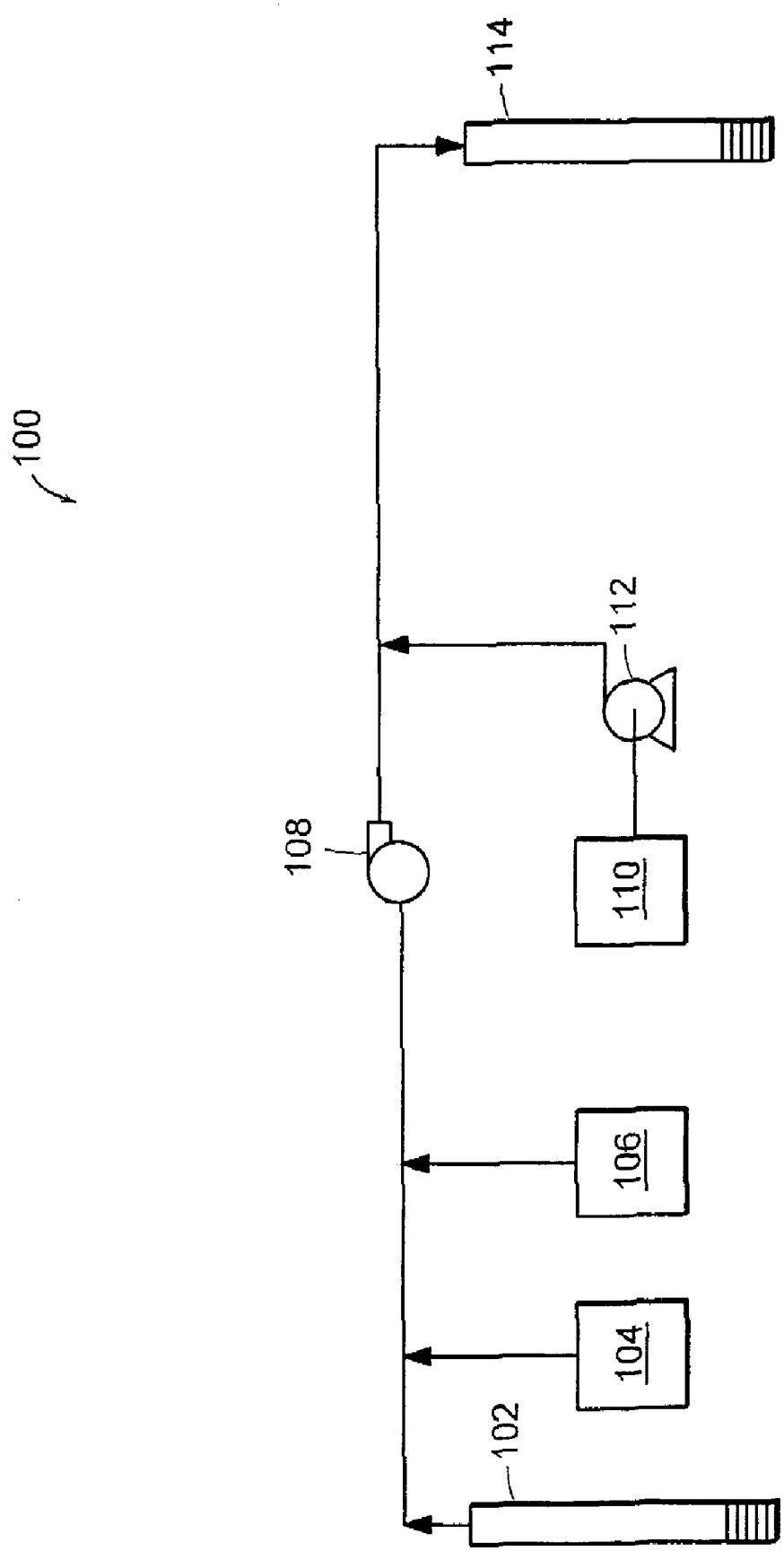
FIG. 1 illustrates a process flow diagram for carrying out one embodiment of a method of this invention.

A description of preferred embodiments of the invention follows. While this invention has been particularly shown and described with references to preferred embodiments thereof, it will be understood by those skilled in the art that various changes in form and details may be made therein without departing from the scope of the invention encompassed by the appended claims.

Anaerobic bioremediation is remediation by biological degradation or transformation of organic or inorganic compounds in the absence of oxygen. Oxygen is used by some microorganisms for the oxidation of organic or inorganic compounds and is called an electron acceptor. The organic or inorganic compounds that are oxidized are called electron donors or substrates. Anaerobic bacteria use alternative electron acceptors in the absence of oxygen. Some subsurface contaminants, such as perchlorates, nitrates, trichloroethene ("TCE"), and perchloroethene ("PCE"), are known to be alternative electron acceptors, and are thus are amenable to anaerobic bioremediation.

Perchlorate ($ClO_4^-$) can serve as an electron acceptor during microbial respiration leading to its ultimate conversion to chloride and water via the following half reaction:

$$ClO_4^- + 8H^+ + 8e^- \rightarrow Cl^- + 4H_2O$$

Nitrates ($NO_3^-$) can also serve as electron acceptors for nitrate-respiring bacteria, also known as denitrifiers, via the following half reaction:

$$NO_3^- + 6H^+ + 5e^- \rightarrow 5N_2 + 3H_2O$$

Halogenated Volatile Organic Compounds ("HVOCs"), such as PCE and TCE, can also serve as electron acceptors in a process known as reductive dechlorination. This process proceeds stepwise with a single dechlorination occurring at a time as follows:

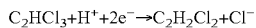

where cDCE is cis-1,2-dichloroethene and VC is vinyl chloride. (For simplicity, stoichiometric relations and generation of chloride ion were not shown in the previous equation.) Each reductive step (e.g., from PCE to TCE or from TCE to cDCE) requires two moles of electrons per mole of HVOC as shown in the half reaction for TCE ($C_2HCl_3$) reductive dechlorination to cDCE ($C_2H_2Cl_2$):

$$C_2HCl_3 + H^+ + 2e^- \rightarrow C_2H_2Cl_2 + Cl^-$$

Electron acceptors vary in their susceptibility for reduction based on thermodynamic, kinetic, and microbiological factors. In general, the lower the free energy of reduction, the more reducing or anaerobic the environmental conditions need to be. Oxygen is one of the most easily reduced electron acceptors because it has the greatest free energy of reduction and thus is typically the first electron acceptor to be consumed. Other electron acceptors typically will not be consumed in the presence of oxygen. Nitrate is typically reduced next and then perchlorate. HVOCs vary in their ability to be reduced. PCE and TCE are fairly easily reduced to cDCE. Complete reduction to ethene typically requires the existence of very low oxidation-reduction potentials commensurate with methanogenic conditions.

The reductive half reactions that involve soil contaminants (e.g., perchlorate and HVOCs) utilize a companion oxidative half reaction in order to proceed. The oxidative reactions are facilitated with the presence of an electron donor/substrate. It has been discovered that many different compounds are suitable electron donors/substrates, including sugars (e.g., as in molasses), lactic acid, methanol, ethanol, volatile fatty acids (e.g., acetic acid), hydrogen, vegetable oil, petroleum hydrocarbons, and natural organic carbon. If the soil is contaminated with nitrates, perchlorates, and HVOCs, microbial oxidation of an electron donor/substrate will initially result in the consumption of oxygen, then nitrate, then perchlorate. HVOCs will then be reduced along with sulfate (to sulfide) and carbon dioxide (to methane). Complete reduction of HVOCs to ethene will depend on several factors including oxidation-reduction potential, sulfate concentrations, and presence of the requisite bacteria. Other factors, including the concentration of bioavailable ferric iron, another electron acceptor, can affect this reductive reaction in the environment.

This invention provides for the in situ bioremediation of subsurface contaminants by introducing a vapor-phase electron donor. In one embodiment, this invention is a method of stimulating anaerobic degradation of subsurface contaminants. The method comprises the steps of vaporizing an electron donor to form an electron donor gas, mixing the electron donor gas with a carrier gas to form a treating gas with an electron donor component, and directing the treating gas to a subsurface injection site. The electron donor is a liquid at a temperature of 0° C. and a pressure of 1 atmosphere and the subsurface injection site includes at least one contaminant. The treating gas stimulates anaerobic degradation of at least a portion of the contaminant.

In another embodiment, this invention is a method for stimulating anaerobic degradation of subsurface perchlorate contaminants, comprising the step of directing hydrogen gas to a subsurface site. The subsurface site includes at least one perchlorate contaminant and the hydrogen gas stimulates anaerobic degradation of at least a portion of the perchlorate contaminant.

As used herein, the term "stimulate" refers to initiating anaerobic degradation of at least one subsurface contaminant or increasing the rate at which one or more subsurface contaminants are anaerobically degraded. By providing an increased supply of suitable electron donor material, the methods of this invention provide for anaerobic degradation of subsurface contaminants at a rate that is larger or faster than would occur without this method. The electron donor stimulates or increases the rates at which subsurface contaminants are anaerobically degraded by increasing the rate at which a microorganism utilizes a contaminant in one or more metabolic processes and/or increases the population density of those microorganisms that are able to use the contaminant in one or more metabolic processes.

The methods of this invention can be applied to any material which a microorganism is able to use as an electron acceptor during at least a portion of one or more metabolic processes and results in the chemical reduction of the electron acceptor. Preferably, the material is a contaminant (i.e., a material that, once exposed to a living organism, produces at least one detrimental health effect in that organism). Examples of contaminants suitable for treatment by the methods of this invention include, but are not limited to, nitrates, perchlorates, halogenated organic compounds (e.g., chlorinated compounds), and HVOCs.

The methods of this invention can be used to stimulate the bioremediation of subsurface contaminants. The subsurface contaminants can be located in soil, groundwater, or perched water, including contaminants that are located in relatively shallow soil (e.g., soil that is within about 5 to about 20 feet of the surface) and soil that is deeper below ground level (e.g., greater than 20 feet below the surface). Preferably, the methods are applied to soil or subsurface water that is located below either a sufficient amount of soil or an impermeable cap or liner to prevent the treating gas or hydrogen from escaping to the surface. More preferably, the methods are applied to soil or subsurface water that is at least 5 feet below the ground surface. Most preferably, the methods are applied to soil or subsurface water that is at least 20 feet below the ground surface. The maximum depth to which these methods are applicable is only limited by the depth to which a well can be drilled and gas injected into that well. In some embodiments, the methods are applied to soil in the vadose zone.

Electron donors for use in the methods of this invention include hydrogen and any material which a microorganism is able to use as an electron donor during at least a portion of one or more metabolic processes and is a liquid at normal temperature and pressure (i.e., a temperature of 0° C. and a pressure of 1 atmosphere). Examples of suitable electron donors include alkenes (e.g., hexene, octene, isoprene, butadiene, and isomers thereof), alkynes, aromatic hydrocarbons (toluene, xylene, cumene, cymene, and isomers thereof), organic alcohols (e.g., methanol, ethanol, propanol, butanol, and isomers thereof), organic acids (e.g., formic acid, acetic acid, propionic acid, butyric acid, and isomers thereof), aldehydes, amines (e.g., dimethylamine, diethylamine, ethanolamine, and isomers thereof), ketones (e.g., methyl ethyl ketone, ethyl vinyl ketone, acetone, and isomers thereof), esters (e.g., ethyl acetate, butyl acetate, and isomers thereof), hydrocarbons that are liquid at normal temperature and pressure, and mixtures thereof. Examples of preferred electron donors include ethanol, ethyl acetate, and/or akenes If in a liquid phase, the electron donor is vaporized to form a gas and directed to one or more subsurface sites that include contaminants. Applying the electron donor as a vaporized gas provides for better dispersion of the electron donor at the subsurface site than is provided by a liquid electron donor, thereby enhancing the bioremediation of subsurface contaminants. In some embodiments, the electron donor is mixed with a carrier gas to form a treating gas with an electron donor component. In further embodiments, a liquid electron donor is contacted with a carrier gas and the contact vaporizes the liquid electron donor, thereby forming the treating gas.

Optionally, the electron donor is heated to vaporize the electron donor or facilitate vaporization of the electron donor. In some embodiments, this heat is provided as excess heat from a blower. The vaporized electron donor is directed to the subsurface site by injection through one or more wells that are screened in one or more desired subsurface zones or locations. In further embodiments, the vaporized electron donor is directed to subsurface site(s) under conditions that ensure the vaporized electron donor remains in the gas phase and does not condense or form a second phase. In still further embodiments, the pressure and/or temperature of the vaporized electron donor is controlled to prevent the vaporized electron donor from forming a second phase (e.g., condensing to form an aerosol).

In some embodiments, the electron donor is mixed with one or more carrier gases to form a treating gas with the electron donor included as a component of the treating gas. The treating gas is directed to one or more subsurface sites. In further embodiments, the partial pressure of the electron donor component of the treating gas is controlled to prevent the partial pressure from exceeding the saturation vapor pressure of the electron donor. In this way, the electron donor component is prevented from condensing or forming a second phase as the treating gas is applied to the subsurface site. In some embodiments, the amount of electron donor mixed or included in the treating gas is controlled or metered to control the partial pressure of the electron donor component in the treating gas. Optionally, the treating gas is heated to assist in preventing the electron donor component from forming a second phase or to promote vaporization of the electron donor.

Examples of suitable carrier gases include steam, air, carbon dioxide, nitrogen, argon, gas or gasses extracted from the subsurface, and mixtures thereof. The metabolic processes of microorganisms that provide for bioremediation of contaminants normally utilize any available oxygen as an electron acceptor before utilizing a contaminant. Therefore to increase bioremediation efficiency, the amount of the electron donor in the treating gas is in stoichiometric excess compared to the amount of any oxygen, thereby ensuring that bioremediation of the contaminants will occur. Optionally, the carrier gas is substantially devoid of oxygen.

In some embodiments, the carrier gas includes steam or water-humidified gas to increase the moisture content of subsurface soil. In still more embodiments, steam or water-humidified gas is injected separately before or after a gaseous electron donor is directed to the subsurface to increase the moisture content of subsurface soil.

In some embodiments, water and/or nutrients are injected with the gaseous electron donor or as a component of the treating gas to assist microorganisms in the bioremediation processes. In further embodiments, the water and/or nutrients are in a gas phase. Examples of gaseous nutrients include materials that will act as a nitrogen and/or phosphorous source for the microorganism (e.g., amines, ammonia, and nitrous oxide). In further embodiments, one or more species of bacterial are injected into the subsurface to assist in the in situ bioremediation processes.

Design of the wells and injection flow rates can be dependent on the specific soil or groundwater matrix and the specific electron donor(s) used in the method. The electron donor, or treating gas if a carrier gas is used, is injected into the soil, groundwater, or perched water through one or more wells that are screened in the desired soil, perched water, or groundwater zone. Design of the well(s) will be based on standard engineering methods for soil vapor injection wells and groundwater sparging wells. Spacing of wells and injection flow rates will be dependent on the specific soil or groundwater matrix and the specific electron donor chosen.

Additional factors to consider during the design of a soil treatment system using this invention include soil permeability, soil moisture, soil organic carbon content, soil vapor oxygen concentration, soil perchlorate concentration, soil nitrate concentration, electron donor Henry's constant, electron donor organic carbon partition coefficient, electron donor ionizability, electron donor vapor pressure, electron donor anaerobic biodegradability, carrier gas acidity, and carrier gas oxygen concentration. These factors will be used to determine well spacing, flow rates, the specific electron donor(s) used, the specific carrier gas or gasses used, injection temperature, and use of continuous versus discontinuous injection modes to result in creation of anaerobic conditions in situ and the ultimate biodegradation of the contaminant(s). Other factors to consider during the design of a groundwater treatment system using this invention include aquifer permeability, groundwater velocity, soil organic carbon content, groundwater dissolved oxygen concentration, groundwater perchlorate concentration, groundwater nitrate concentration, saturated or perched water thickness that is contaminated with nitrate and/or perchlorate, electron donor Henry's constant, electron donor organic carbon partition coefficient, electron donor ionizability, electron donor vapor pressure, electron donor anaerobic biodegradability, carrier gas acidity, and carrier gas oxygen concentration. These factors will be used to determine well spacing, flow rates, the specific electron donor(s) used, the specific carrier gas or gasses used, injection temperature, injection pressure, and use of continuous versus discontinuous injection modes to result in creation of anaerobic conditions in situ and the ultimate biodegradation of nitrate and/or perchlorate.

The exact electron donor or mixture of electron donors used in this invention will vary depending on the needs of the given application. In some embodiments, the electron donor(s) is chosen because it is less expensive and/or provides for a more thorough remediation of the specific subsurface contaminant(s). In other embodiments, considerations for the type of soil, the moisture content of the soil surrounding the injection well(s), and/or subsurface conditions (e.g., subsurface temperature and/or pressure) in the well will dictate the choice of electron donor(s) to be used in the methods. For example, if the soil moisture is high, it can be preferable to use an electron donor or mixture of electron donors with a relatively high Henry's constant (e.g., ethyl acetate). A high Henry's constant will result in better dissolution of the gaseous electron donor into the soil moisture, and provide for more efficient distribution of the electron donor into the surrounding soil. However, if the soil moisture is low, an electron donor or mixture of electron donors with a relatively low Henry's constant (e.g., ethanol) can produce satisfactory remediation. If perched water is to be remediated, it can be preferable to use an electron donor or mixture of electron donors having a low Henry's constant. The Henry's constant of the electron donor can be adjusted by using different types of electron donors or varying the composition of a mixture of electron donors, thereby providing for a desired amount or degree of electron donor distribution into the subsurface.

In some embodiments, the electron donor or mixture of donors has a Henry's constant of about $1 \times 10^{-4}$ $(atm)(m^3)/mol$ or greater (e.g., the Henry's constant of ethyl acetate, which is $\sim 1.4 \times 10^{-4}$ $(atm)(m^3)/mol$, or greater). In other embodiments, the electron donor or mixture of donors has a Henry's constant of about $1.0 \times 10^{-6}$ $(atm)(m^3)/mol$ or less (e.g., the Henry's constant of ethanol, which is $\sim 5.0 \times 10^{-6}$ $(atm)(m^3)/mol$, or less). In yet other embodiments, the electron donor or mixture of donors has a Henry's constant in the range of between $\sim 1 \times 10^{-4}$ $(atm)(m^3)/mol$ and $\sim 1.0 \times 10^{-6}$ $(atm)(m^3)/mol$ (e.g., in the range of between about $\sim 1.4 \times 10^{-4}$ $(atm)(m^3)/mol$ and $\sim 5.0 \times 10^{-6}$ $(atm)(m^3)/mol$).

Furthermore, other subsurface conditions (i.e., the temperature and/or pressure at the location of stimulation) can vary from application to application, and one type of electron donor or certain mixtures of electron donors can provide more advantageous physical properties than other types of electron donors or mixtures of electron donors. For example, the subsurface temperature of the injection well can cause the partial pressure of an electron donor component to reach its saturation vapor pressure and result in the condensation of the electron donor from the treating gas before the treating gas has reached the subsurface site. In this case, it can be preferable to chose an electron donor(s) that will not condense at that temperature. Optionally or additionally, the ratio of gaseous electron donor to carrier gas in the treating gas is reduced to prevent condensation of the electron donor gas by ensuring that the partial pressure of the electron donor component does not reach the saturation vapor pressure before the treating gas has reached the subsurface site. In another example, the electron donor(s) are chosen to provide a desired nitrogen content at the stimulation site.

FIG. 1 illustrates a process flow diagram for one embodiment of the invention. Process 100 includes extraction well 102, atmosphere source 104, carrier gas supply 106, blower 108, electron donor source 110, pump 112, and injection well 114. Blower 108 is used to convey a carrier gas that can include gas extracted from the subsurface by extraction well 102, atmospheric air from atmosphere source 104, and/or other carrier gas from carrier gas supply 106 toward injection well 114. Atmosphere source 104 can include tanks of compressed atmospheric air or simply a vent that allows atmospheric air into process 100. Carrier gas source 106 can include nitrogen or other gasses supplied as compressed gas, refrigerated liquid, or via generation by membrane or pressure swing adsorption processes. The electron donor is added from electron donor source 110 by pump 112. Injection well 114 is screened either in the groundwater or the soil.

Process 100 can be run in a continuous or discontinuous manner. A continuous operation involves injection of carrier gas and electron donor continuously until a desired amount of contaminant is destroyed or bioremediated. In situ biodegradation occurs simultaneously with above ground equipment operation. Discontinuous operation involves injection of carrier gas and electron donor for a period of time until the desired mass of electron donor has been delivered to the soil or groundwater. Operation of above ground equipment is then stopped and in situ biodegradation is allowed to proceed. Operation of process 100 can be discontinuous or pulsed if desired. Discontinuous operation is in general more applicable to soil treatment than groundwater treatment, however, it can be useful for treatment of perched groundwater that is not flowing or is flowing slowly.

Selection of continuous versus discontinuous operation will be driven in part by the saturation vapor pressure of the electron donor relative to the total electron donor demand attributable to oxygen, nitrate, and perchlorate. The greater the demand the greater the mass of electron donor that must be injected which is limited by the saturation vapor pressure and the carrier gas flow rate. Special consideration must be given to use of air or oxygen-laden soil vapor as a carrier gasses. The oxygen present in these carrier gasses will, in the presence of bacteria, consume the electron donor. However, by careful selection of electron donors that have lower Henry's constants than oxygen, a process can be designed that results in a stoichiometric excess of electron donor in the soil moisture or groundwater. This stoichiometric excess of electron donor is required to ensure sufficiently anaerobic conditions develop for the degradation of nitrate or perchlorate.

Optionally, the progress of the bioremediation is monitored by soil gas analysis for nitrous oxide, hydrogen, carbon dioxide, hydrogen sulfide, dinitrogen gas, and/or other gases produced by microorganisms as they metabolize the contaminants.

In another embodiment, this invention is a method of stimulating anaerobic degradation of subsurface perchlorate contamination. The method comprises the steps of vaporizing an electron donor to form an electron donor gas, mixing the electron donor gas with a carrier gas to form a treating gas with an electron donor component, and directing the treating gas to a subsurface injection site. The electron donor is a liquid at a temperature of 0° C. and a pressure of 1 atmosphere and the subsurface injection site includes at least one perchlorate contaminant. The treating gas stimulates anaerobic degradation of at least a portion of the perchlorate contamination.

In yet another embodiment, this invention is a method of stimulating anaerobic degradation of subsurface contaminants, comprising the steps of vaporizing an electron donor to form an electron donor gas, mixing the electron donor gas with a carrier gas to form a treating gas with an electron donor component, and directing the treating gas to a subsurface injection site. The electron donor is a liquid at a temperature of 0° C. and a pressure of 1 atmosphere and the amount of liquid electron donor gas mixed with the carrier gas is controlled to prevent the electron donor component from condensing before the treating gas reaches the subsurface injection site. The subsurface injection site includes at least one contaminant and the treating gas stimulates anaerobic degradation of at least a portion of the contaminant.

In one embodiment, this invention is a method of stimulating anaerobic degradation of subsurface perchlorate contamination. The method comprises the steps of vaporizing liquid ethanol to form ethanol gas; mixing the ethanol gas with a carrier gas to form a treating gas that includes from about 0.1% to about 2.5% ethanol gas by volume; and directing the treating gas to a subsurface injection site. The subsurface injection site includes at least one perchlorate contaminant and the treating gas stimulates anaerobic degradation of at least a portion of the perchlorate contamination.

In one embodiment, this invention is a method of stimulating anaerobic degradation of subsurface perchlorate contamination. The method comprises the steps of vaporizing liquid ethyl acetate to form ethyl acetate gas; mixing the ethyl acetate gas with a carrier gas to form a treating gas that includes from about 0.1% to about 4% ethyl acetate gas by volume; and directing the treating gas to a subsurface injection site. The subsurface injection site includes at least one perchlorate contaminant and the treating gas stimulates anaerobic degradation of at least a portion of the perchlorate contamination.

In one embodiment, this invention is a method of stimulating anaerobic degradation of subsurface perchlorate contamination. The method comprises the steps of vaporizing liquid hexene to form hexene gas; mixing the hexene gas with a carrier gas to form a treating gas that includes from about 0.1% to about 6.5% hexene gas by volume; and directing the treating gas to a subsurface injection site. The subsurface injection site includes at least one perchlorate contaminant and the treating gas stimulates anaerobic degradation of at least a portion of the perchlorate contamination.

In another embodiment, this invention is a method of stimulating anaerobic degradation of subsurface perchlorate contamination, comprising the steps of vaporizing liquid methanol to form methanol gas; mixing the methanol gas with a carrier gas to form a treating gas that includes from about 0.1% to about 7% methanol gas by volume; and directing the treating gas to a subsurface injection site. The subsurface injection site includes at least one perchlorate contaminant and the treating gas stimulates anaerobic degradation of at least a portion of the perchlorate contamination.

The invention is more specifically illustrated by the following Example. The Example is illustrative and is not meant to be limiting in any way.

EXAMPLES

Samples were collected from a known contamination site in California. Simulated gas phase in situ biodegradation tests were conducted in 26-milliliter (mL) anaerobic pressure tubes sealed with thick butyl rubber stoppers and aluminum crimp seals. Soil was added to the tubes and they were then flushed with nitrogen to remove oxygen from the headspace. Amendments were then added to the tubes which were then incubated at room temperature in the dark.

Twelve test conditions were set up and each was prepared in duplicate. FIG. 2 illustrates a table summarizing the twelve test conditions. The experimental design was that of a factorial experiment involving three factors each at two or three levels. The three factors and their associated levels were electron donor (none, hydrogen, or ethanol), moisture (low or high), nutrients (none or added). Carbon dioxide was added in addition to hydrogen as a source of carbon for growth.

Carbon dioxide and hydrogen were initially added to the tubes in a ratio of about 1 to 4 by volume. The initial amount of hydrogen added to each tube was equivalent to about 120 micromoles of electron equivalents. The initial amount of ethanol added to each tube was equivalent to about 210 micromoles of electron equivalents. Dibasic ammonium phosphate was added as a source of nitrogen and phosphorous nutrients to tubes 7 through 12. The total amounts of nitrogen and phosphate from ammonium phosphate added to each tube were about 0.21 milligrams (mg) and about 0.23 mg, respectively. Ammonium phosphate was added to each tube as an aqueous solution. Finally, different amounts of water (i.e., ~0.2 mL or ~1.0 mL) were added to the tubes depending on the desired moisture level. Moisture was either added as distilled water or as the nutrient solution.

Weekly monitoring of headspace was conducted for hydrogen, carbon dioxide, ethanol, and oxygen. Headspace analysis was by gas chromatography. Oxygen, hydrogen, and carbon dioxide were analyzed on a 15-feet, 60/80 mesh, Carboxen 1000 column with nitrogen as the carrier gas and thermal conductivity detection. Ethanol was analyzed on a 75-meter DB-624 column with nitrogen as the carrier gas and flame ionization detection.

The tubes were harvested, yielding a test period of approximately one month (~34 days). Approximately ten-gram sub-samples were submitted for analysis of nitrate-nitrogen, perchlorate, and total solids. Other samples were analyzed for soil pH by mixing with distilled water and measuring the pH with a standard probe.

Figure 3:
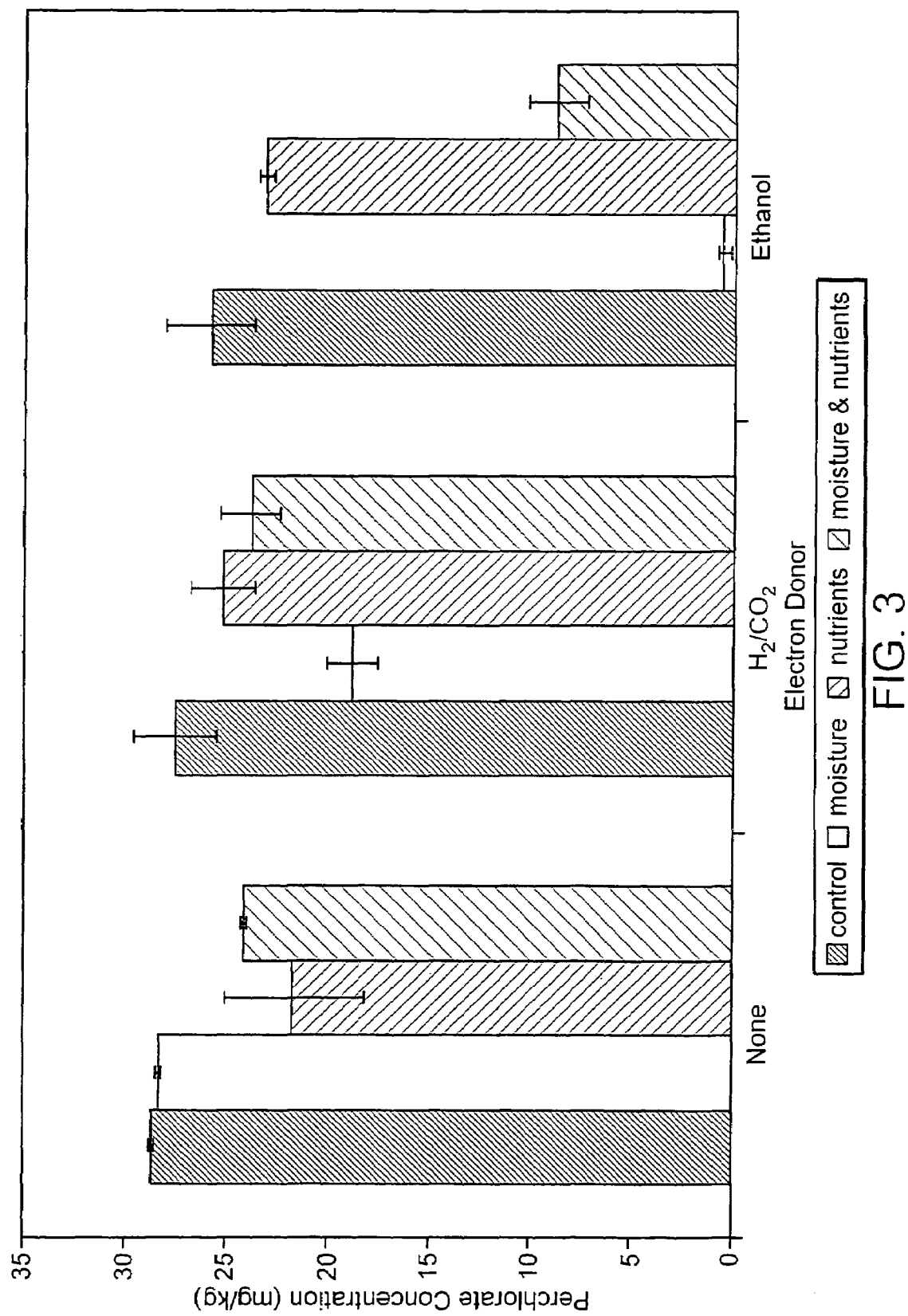
FIG. 3 illustrates a bar graph of final perchlorate concentration in testing samples.
Figure 4:
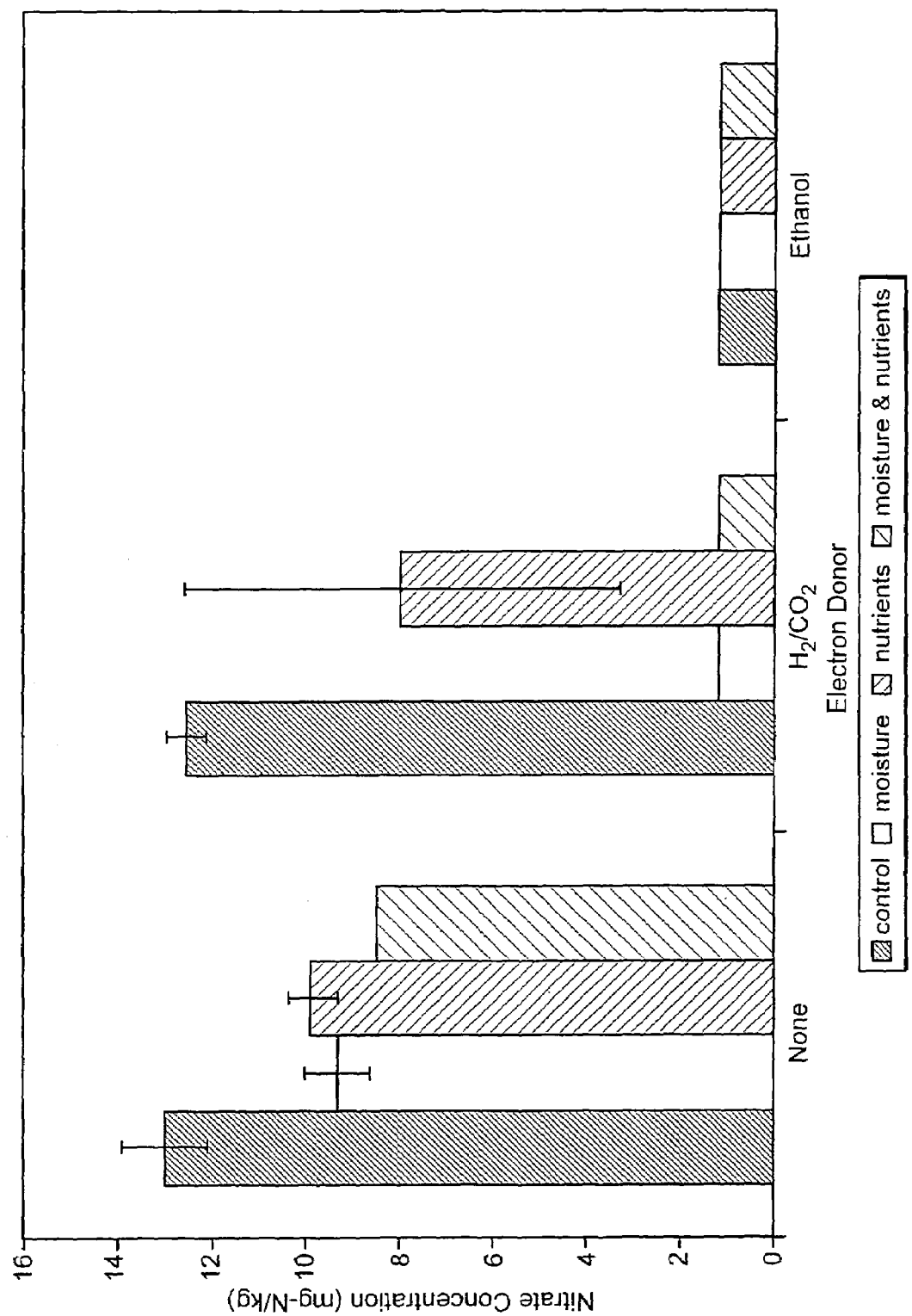
FIG. 4 illustrates a bar graph of final nitrate-nitrogen concentration in testing samples.
Figure 5:
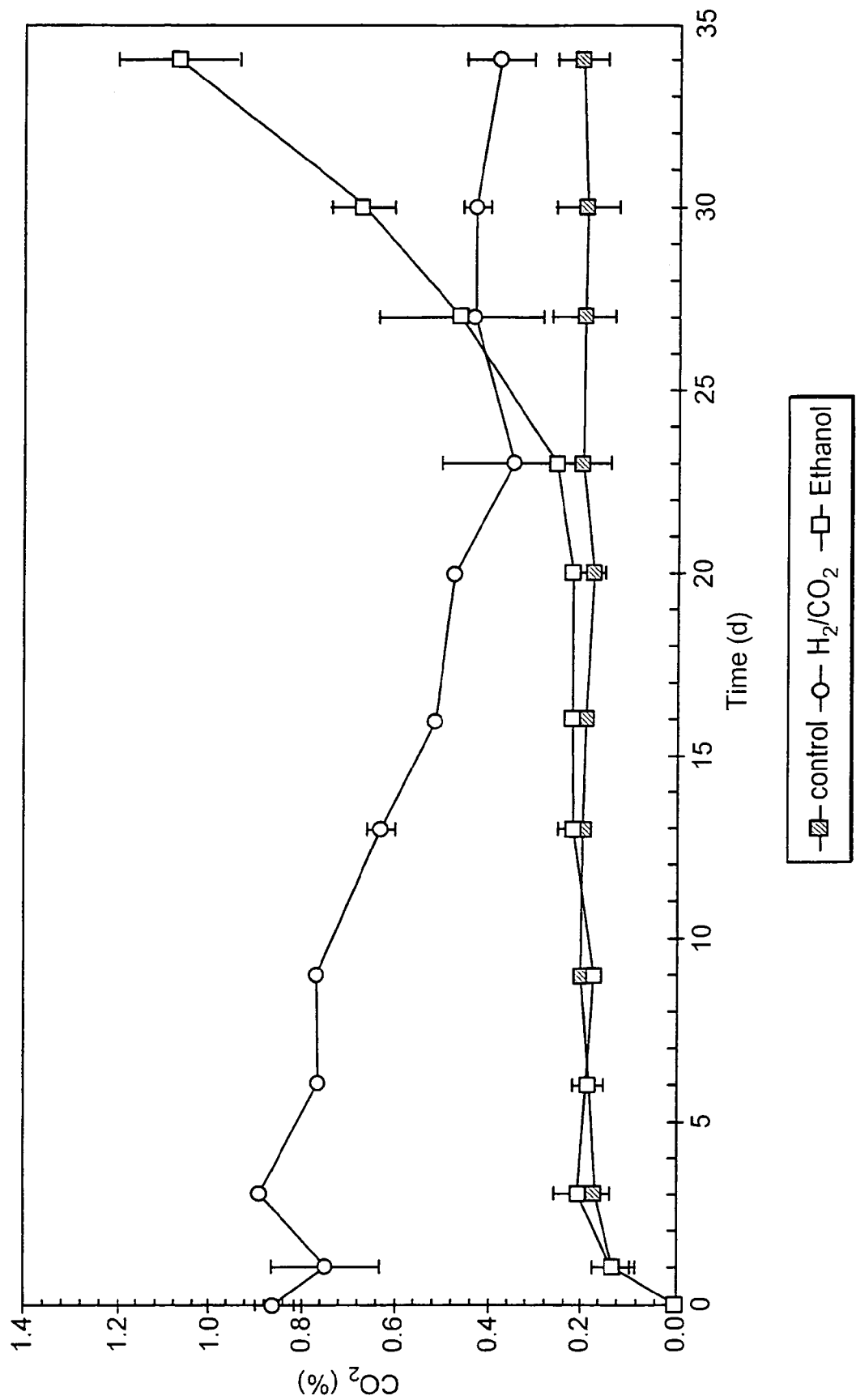
FIG. 5 illustrates a graph of average headspace carbon dioxide concentrations under control conditions.
Figure 6:
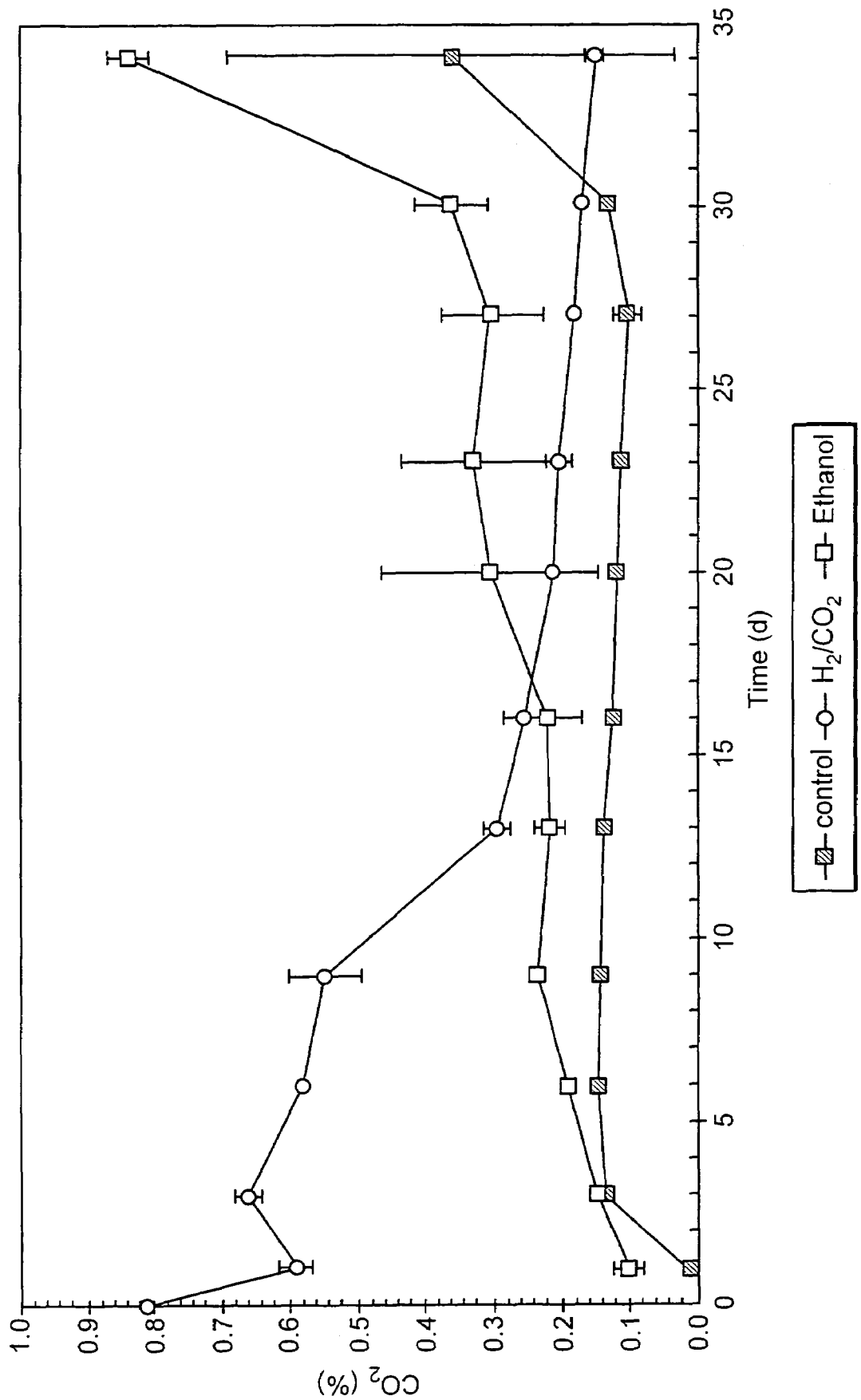
FIG. 6 illustrates a graph of average headspace carbon dioxide concentrations under moisture-amended conditions.
Figure 7:
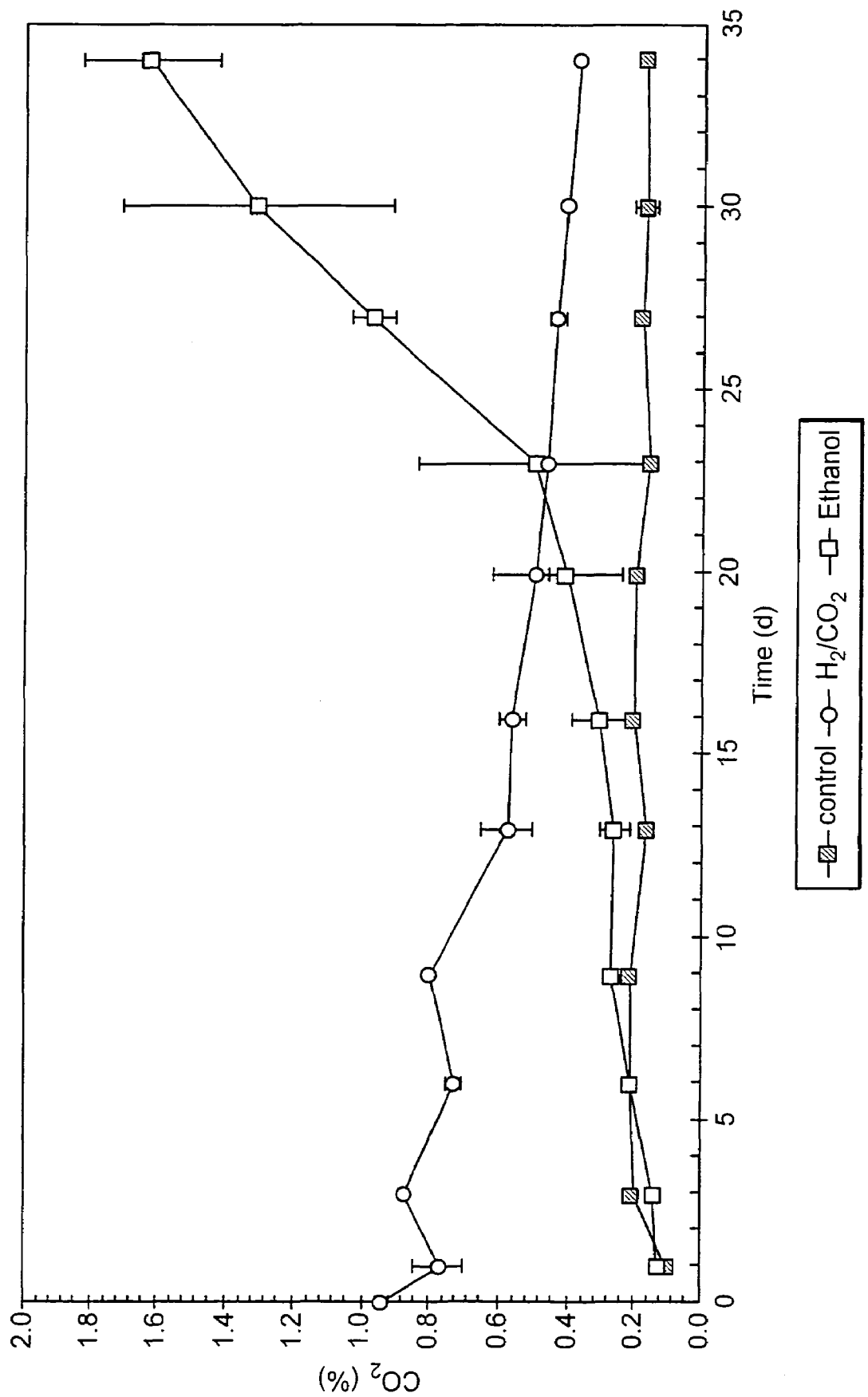
FIG. 7 illustrates a graph of average headspace carbon dioxide concentrations under nutrient-amended conditions.
Figure 8:
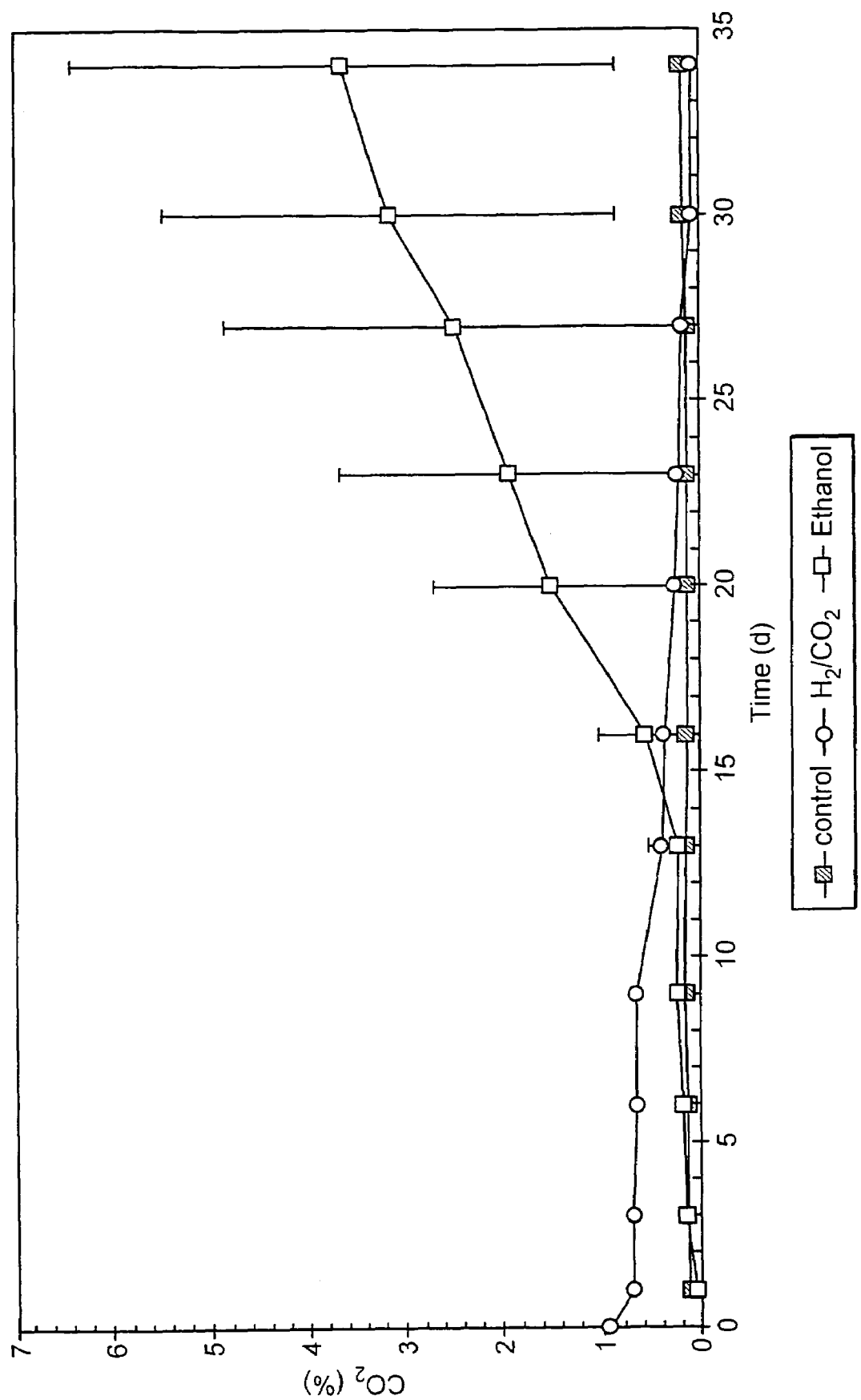
FIG. 8 illustrate a graph of average headspace carbon dioxide concentrations under moisture plus nutrient-amended conditions.

FIGS. 3 and 4 illustrate bar graphs of final perchlorate and nitrate-nitrogen concentration, respectively. Based on the results of the testing, ethanol and hydrogen are both shown to reduce nitrate to non-detectable concentrations within approximately one month of inoculation (the minimum reporting limit [MRL] was 2.4 milligrams per kilogram [mg/kg] and non-detectable limits were given one-half the MRL). Ethanol was capable of reducing the perchlorate concentration from about 74.2 mg/kg to about 0.37 mg/kg and hydrogen was capable of reducing the perchlorate concentration to about 19 mg/kg within approximately one month of inoculation.

The testing data shows that perchlorate was removed only after nitrate was removed, as was expected because biological nitrate reduction typically precedes, or occurs at the same time but more slowly than, biological perchlorate reduction. Moisture appeared to have the most beneficial effect on nitrate and perchlorate reduction in the electron donor amended tests. Nutrients, but not moisture, appeared to have a positive effect on perchlorate reduction only in the tests with no electron donor amendment. Nutrients and moisture appeared to have positive individual effects on nitrate reduction in the tests with no electron donor amendment.

When an electron donor was present, nutrients did not appear to stimulate perchlorate reduction. For both the hydrogen- and ethanol-amended tests, final perchlorate concentrations in the presence of moisture and nutrients were greater than in the presence of moisture alone.

Headspace oxygen concentrations were measured and ranged from non-detected to a single observation of five percent oxygen. Concentrations typically were no greater than two percent. Oxygen can inhibit perchlorate and nitrate reduction and may have leaked into the tubes through needle perforations in the butyl rubber stoppers. Nevertheless, oxygen did not appear to prevent complete reduction of nitrate and nearly complete reduction of perchlorate.

Figure 9:
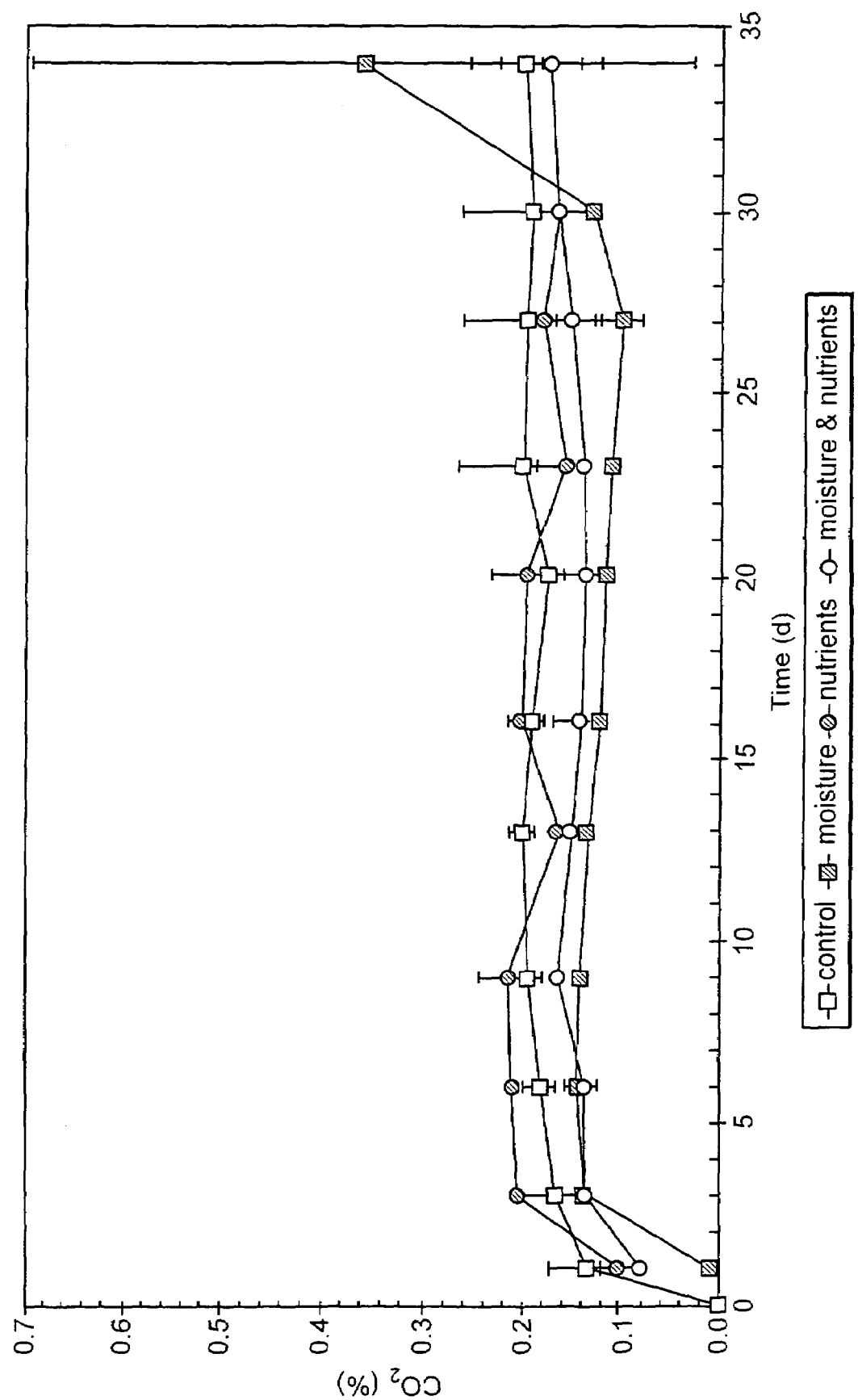
FIGS. 9-11 illustrate the same data as in FIGS. 5-8, but in different grouping of test conditions.
Figure 10:
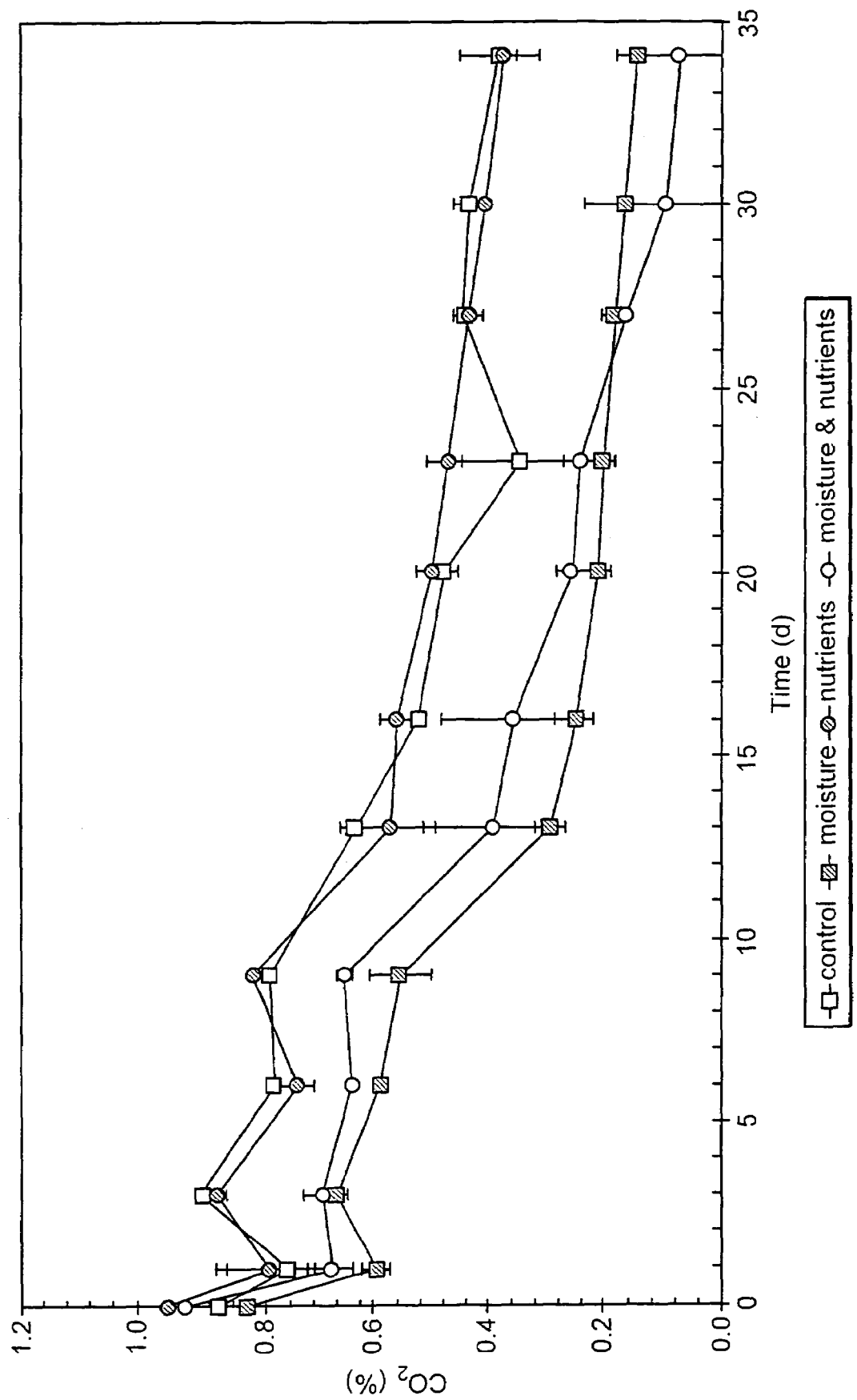
Figure 11:
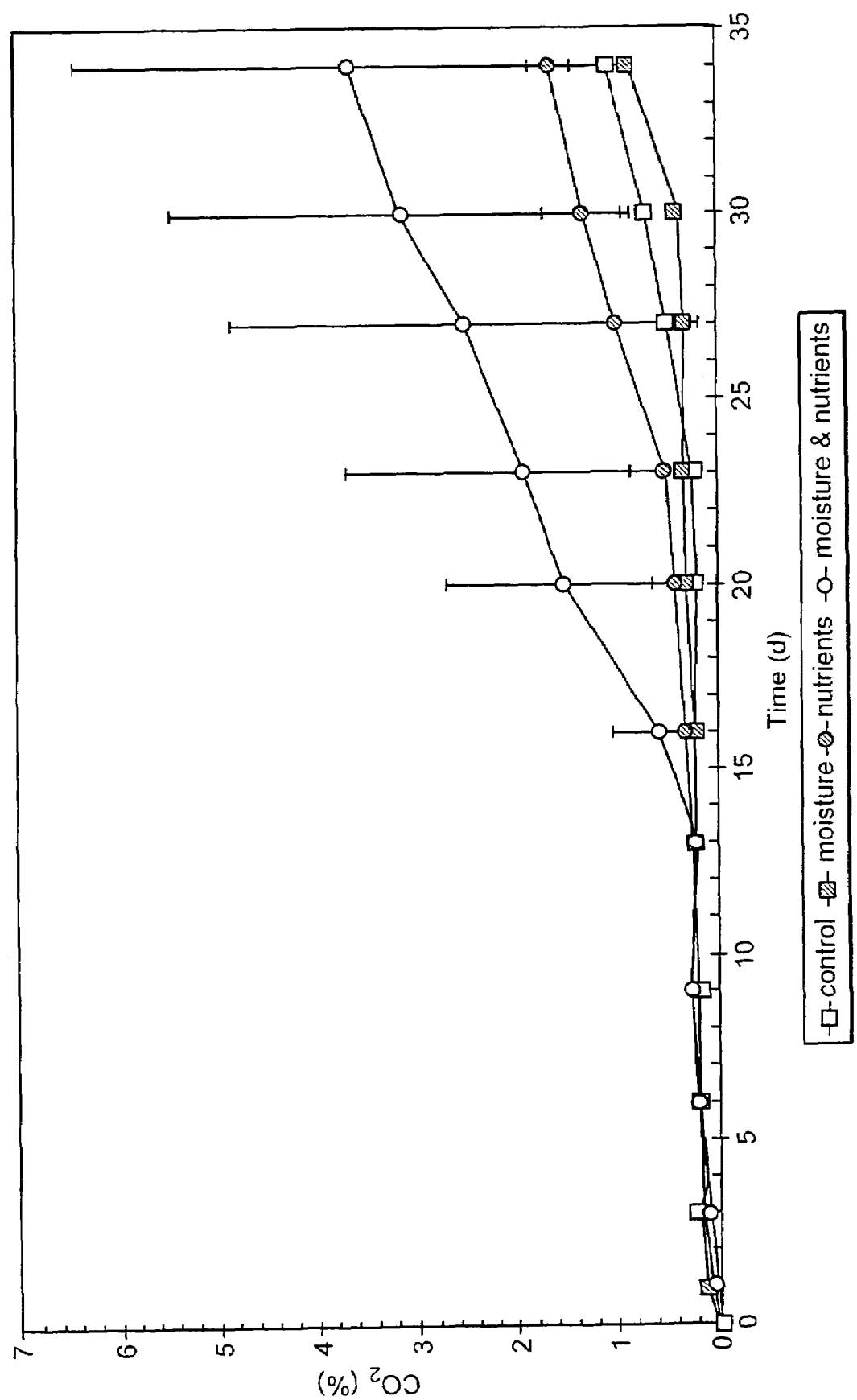

FIGS. 5-8 illustrate graphs of average headspace carbon dioxide concentrations under control, moisture-amended, nutrient-amended, and moisture plus nutrient-amended conditions, respectfully. FIGS. 9-11 illustrate the same data in different grouping of test conditions. The data shows that carbon dioxide consumption in the presence of hydrogen and carbon dioxide production in the presence of ethanol is significantly greater than in the absence of an electron donor. No significant effect of moisture or nutrients on carbon dioxide production was observed in the absence of an electron donor. These results did not correlate to the effects of moisture and nutrients on nitrate and perchlorate reduction. Significantly greater carbon dioxide consumption was observed in hydrogen-amended tubes when the high level of moisture was added. These results correlate somewhat to the effects of moisture and nutrients on nitrate and perchlorate reduction. Significantly greater carbon dioxide production was observed in the ethanol-amended tubes when nutrients were added. These results did not correlate to the effects of moisture and nutrients on nitrate and perchlorate reduction.

Figure 12:
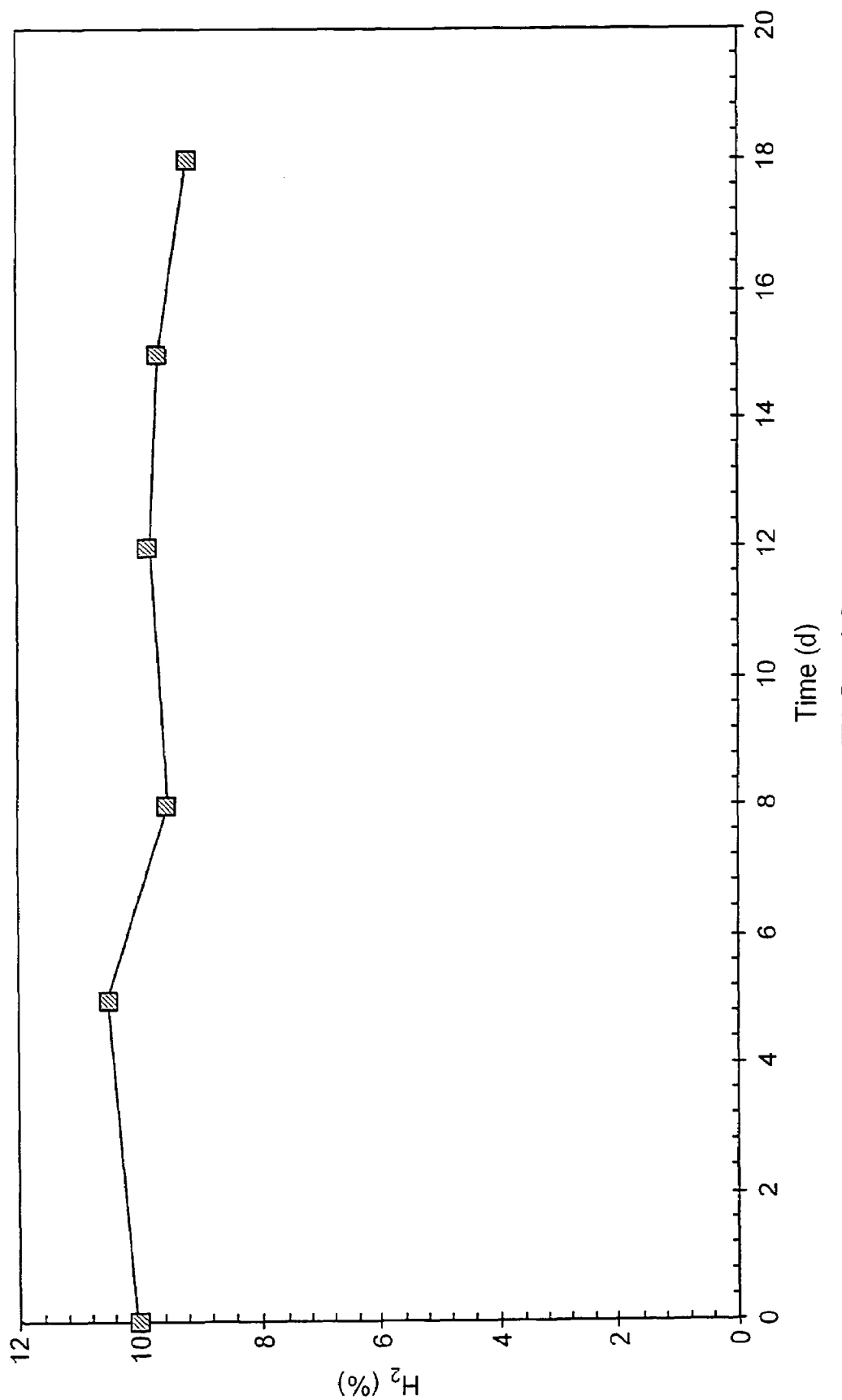
FIG. 12 illustrates a graph of hydrogen concentrations in a separately prepared tube for the purpose of quantifying hydrogen loss through a butyl rubber stopper.

FIG. 12 illustrates a graph of hydrogen concentrations in a separately prepared tube for the purpose of quantifying hydrogen loss through a butyl rubber stopper. The hydrogen concentration decreased by less than ten percent over the 18-day test.

Figure 13:
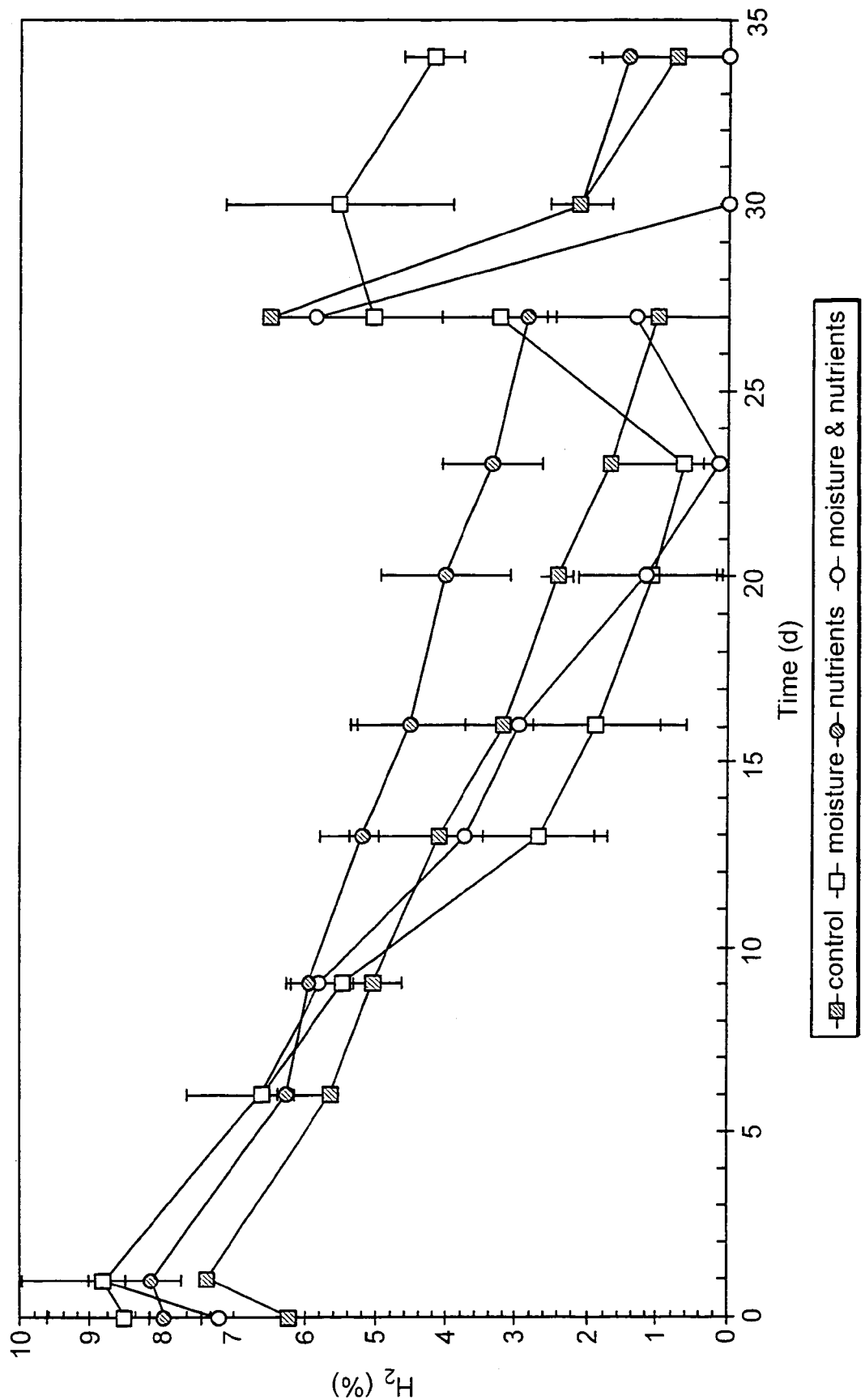
FIG. 13 illustrates a graph of headspace hydrogen concentrations for hydrogen-amended tubes.

FIG. 13 illustrates a graph of headspace hydrogen concentrations for the hydrogen-amended tubes. The data through day 23 indicated that hydrogen consumption was greater in the presence of moisture. Nutrients appeared to inhibit hydrogen consumption as it appeared to inhibit perchlorate reduction and possibly nitrate reduction. Hydrogen was added to tubes 5B and 11A on day 23 and to tubes 2A, 5A, and 11B on day 27 as shown by the increased in hydrogen concentrations.

Figure 14:
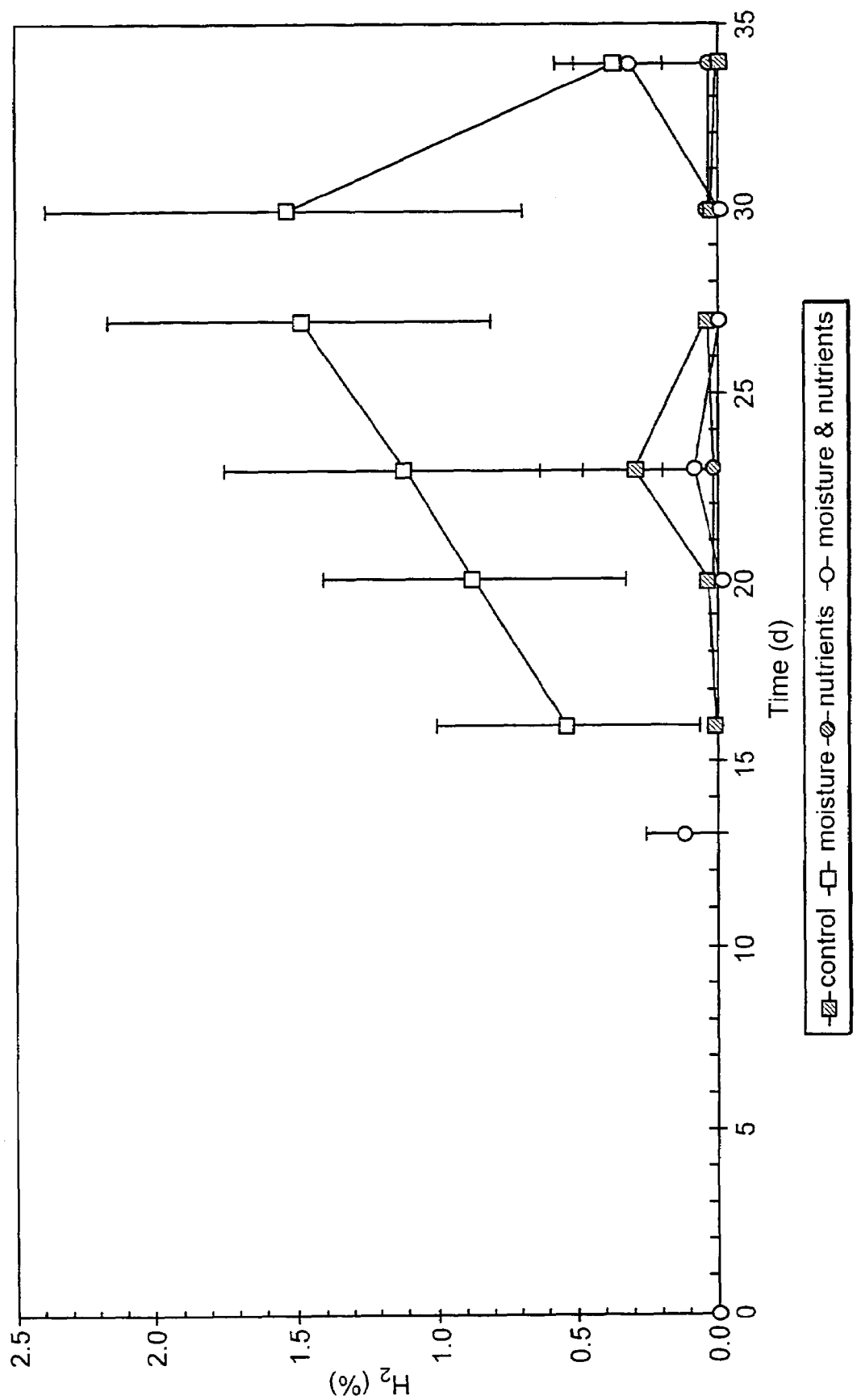
FIG. 14 illustrates a graph of hydrogen concentrations in ethanol-amended tubes.

FIG. 14 illustrates a graph of hydrogen concentrations in the ethanol-amended tubes. Hydrogen was produced most dramatically in the presence of moisture alone. The results suggest ethanol was possibly being fermented to hydrogen and another organic carbon compound such as acetic acid. Between day 30 and 34 hydrogen was reconsumed with a commensurate increase in carbon dioxide production.

Hydrogen consumption in the hydrogen-amended tubes correlated somewhat with differences in nitrate and perchlorate consumption amongst different levels of moisture and nutrients. Hydrogen was consumed in the absence of moisture and nutrients where nitrate and perchlorate were not significantly reduced compared to the initial concentrations. Thus other oxidizing agents such as ferric iron or tetravalent manganese may be present and responsible for hydrogen consumption. Hydrogen production in the ethanol-amended tubes was transient and correlated somewhat to perchlorate reduction. The greatest hydrogen production was observed in the absence of nutrients and with the highest moisture level. These results suggest the responsible microorganisms may have had a low growth yield.

Figure 15:
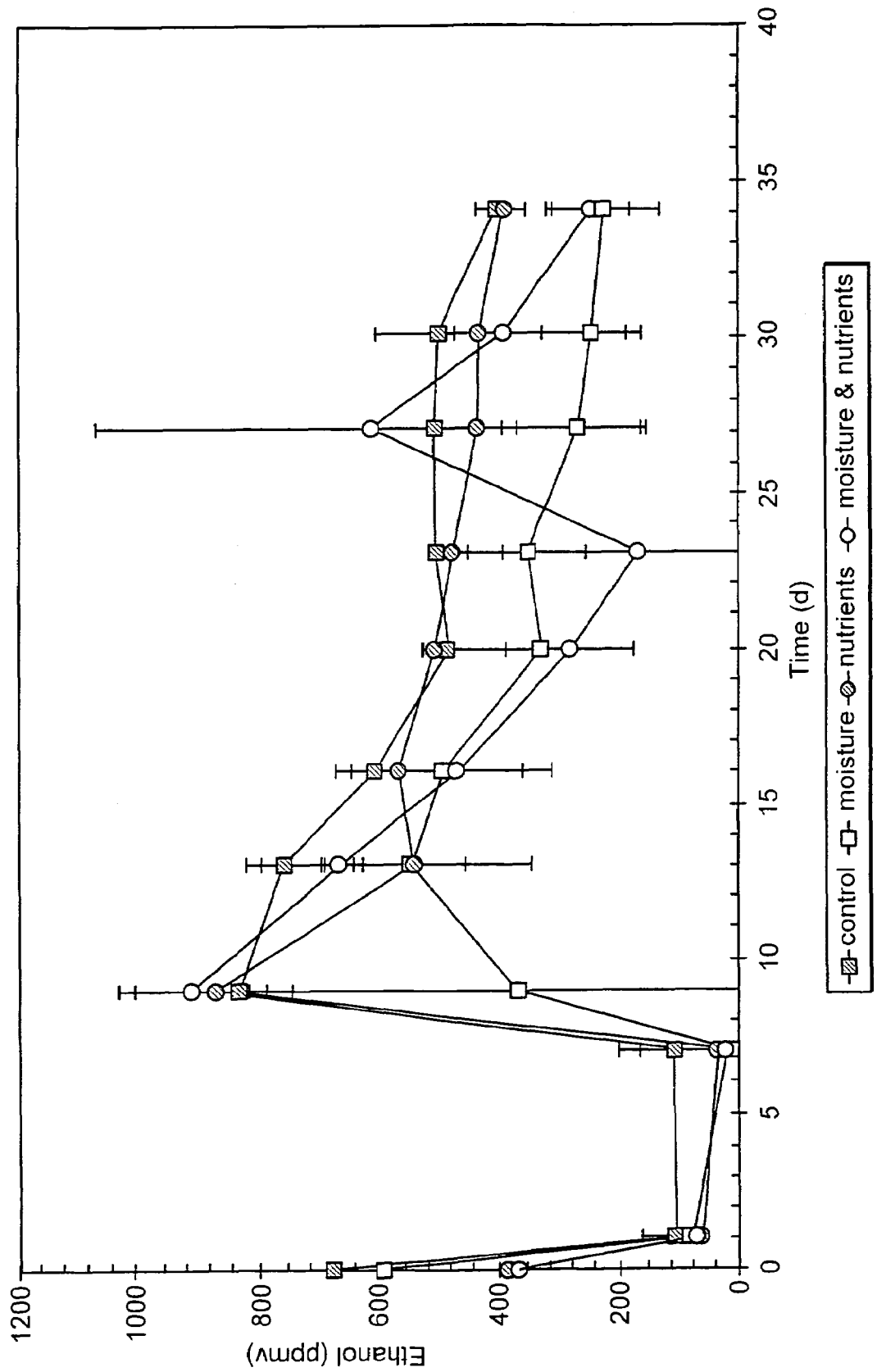
FIG. 15 illustrates a graph of headspace ethanol concentrations.

FIG. 15 illustrates a graph of headspace ethanol concentrations. Gas phase ethanol appeared to be rapidly consumed within one day of set up. It is considered likely, however, that the rapid ethanol consumption was due to absorption into the soil moisture because of its low Henry's constant. In order to allow better monitoring of gas phase ethanol consumption, an additional 10 µL of ethanol was added to each ethanol-amended tube on day 7. Because of this change, a much greater amount of ethanol was used for the study compared to hydrogen in terms of electron equivalents. The figure shows a high error bar for the moisture plus nutrient tube which resulted from tube 12B becoming depleted of ethanol. On day 23, tube 12B was spiked with an additional 10 µL of ethanol.

Ethanol vapors were rapidly dispersed and adsorbed into soil moisture which ostensibly made the electron donor immediately available to soil microbes and electron acceptors that are resident in soil moisture. Ethanol consumption may have been greatest in the presence of supplemental moisture and nutrients. This conclusion is additionally supported by the carbon dioxide production data. Ethanol consumption appears to be greater in the presence of elevated moisture; however, the elevated moisture may have caused increased mass transfer of ethanol into soils moisture rather than increased rates of biodegradation.

Figure 16:
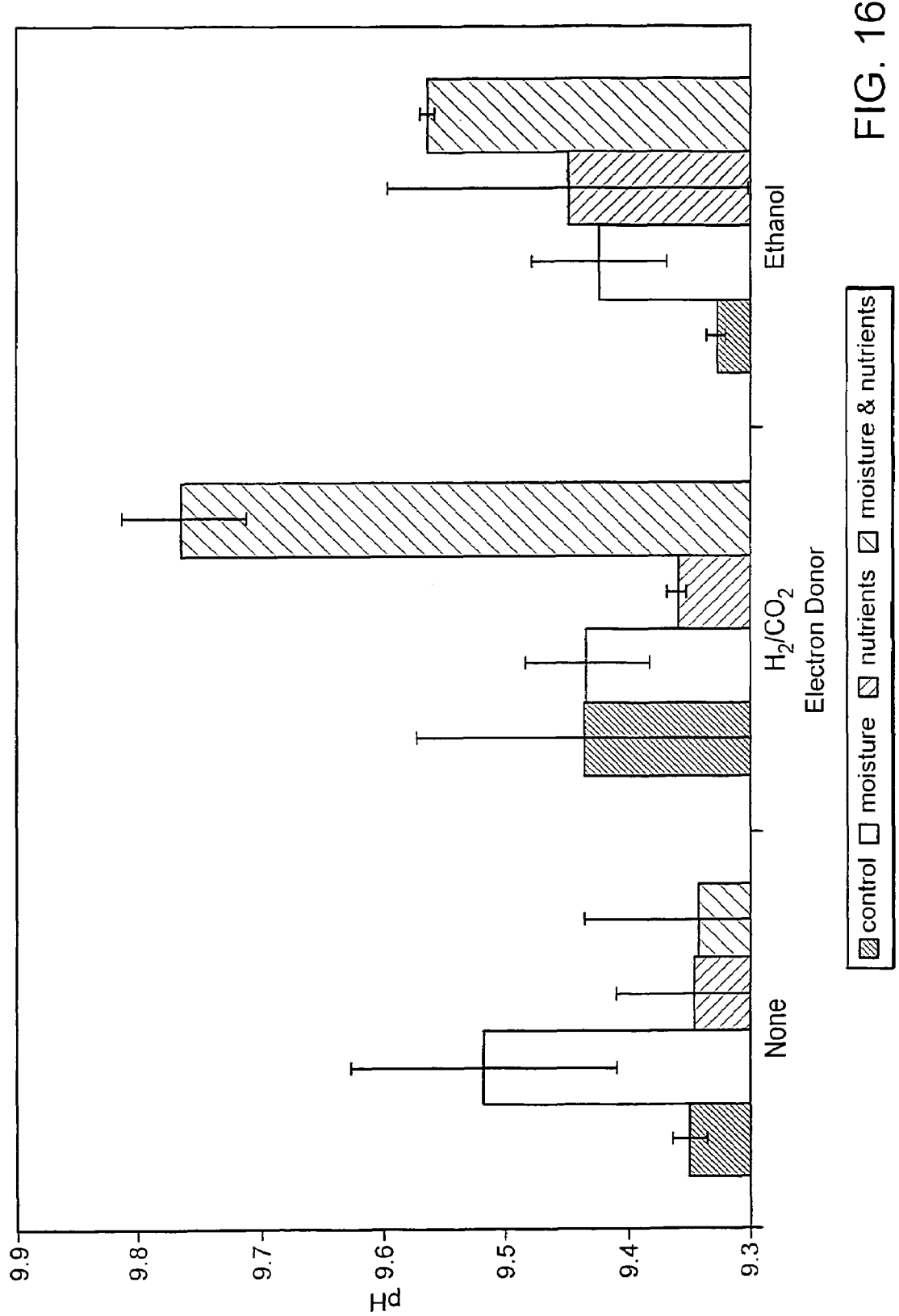
FIG. 16 illustrates a bar graph of final soil pH data.

FIG. 16 illustrates a bar graph of final soil pH data. The initial soil pH was 9.33 which is fairly high and may be partially inhibitory to biological activity. The pH did not change greatly in any of the tubes with the exception of the hydrogen-amended tubes with moisture and nutrients. Consumption of carbon dioxide is not a likely explanation for this pH increase because carbon dioxide consumption was no greater in the moisture-only tubes.

Figure 17:
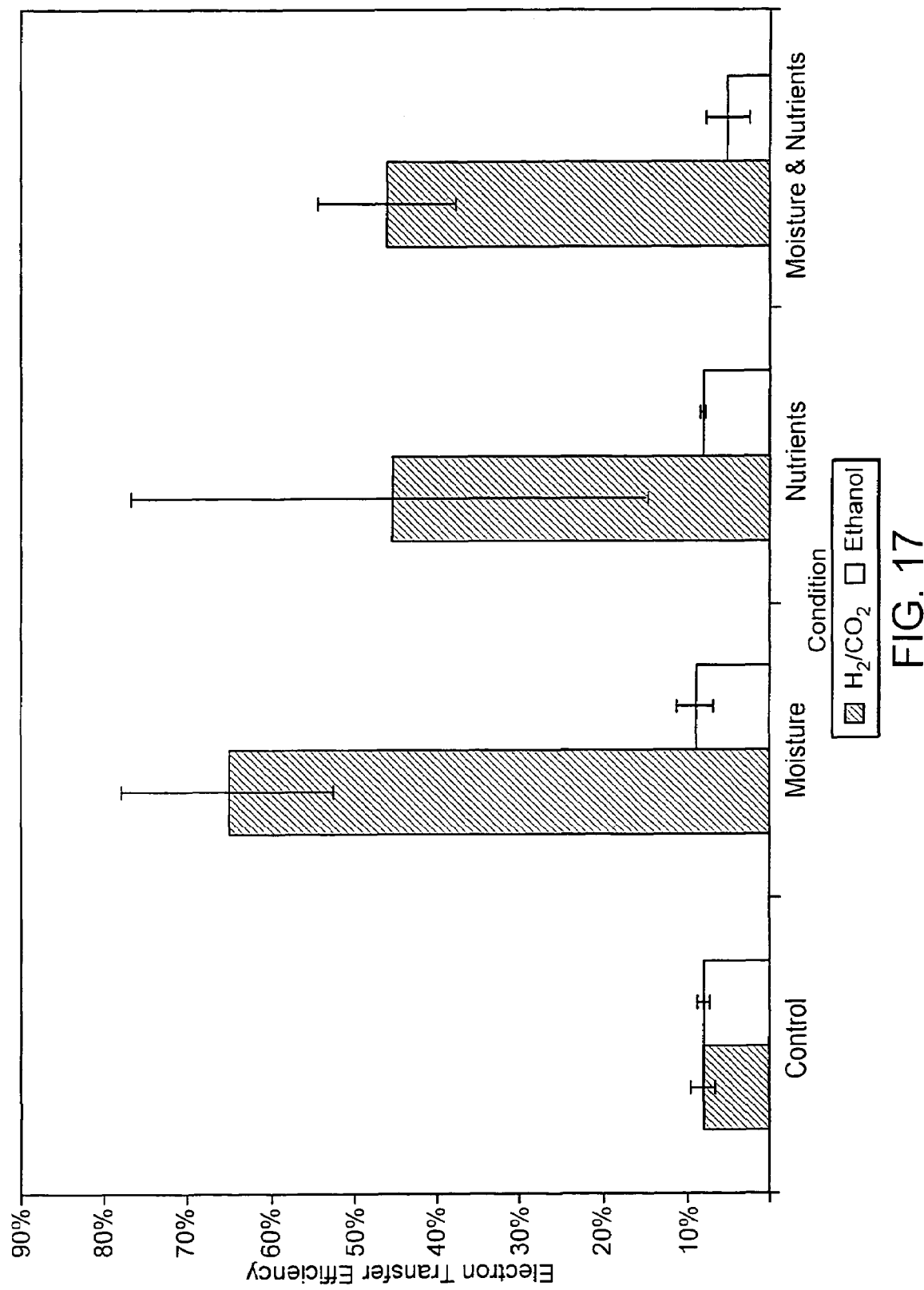
FIG. 17 illustrates a bar graph of electron transfer efficiency.

The greatest perchlorate and nitrate removals were obtained with ethanol as an electron donor. However, a greater number of electron equivalents were added with ethanol compared to hydrogen. The efficiency of perchlorate and nitrate reduction was evaluated by dividing the total number of electrons consumed by nitrate and perchlorate reduction by the total number of available electrons capable of being donated by ethanol or hydrogen. FIG. 17 illustrates a bar graph of the resulting electron transfer efficiency. The results demonstrate that hydrogen was a more efficient electron donor compared to ethanol. In the presence of moisture alone, 65 percent of the electrons from hydrogen were used for perchlorate and nitrate reduction whereas only 9 percent of the electrons from ethanol were used. These results are in part attributable to the use of more ethanol than hydrogen on an electron equivalent basis. Also, while hydrogen was superior to ethanol from an efficiency standpoint, ethanol was superior to hydrogen from a perchlorate and nitrate removal standpoint.

Figure 18:
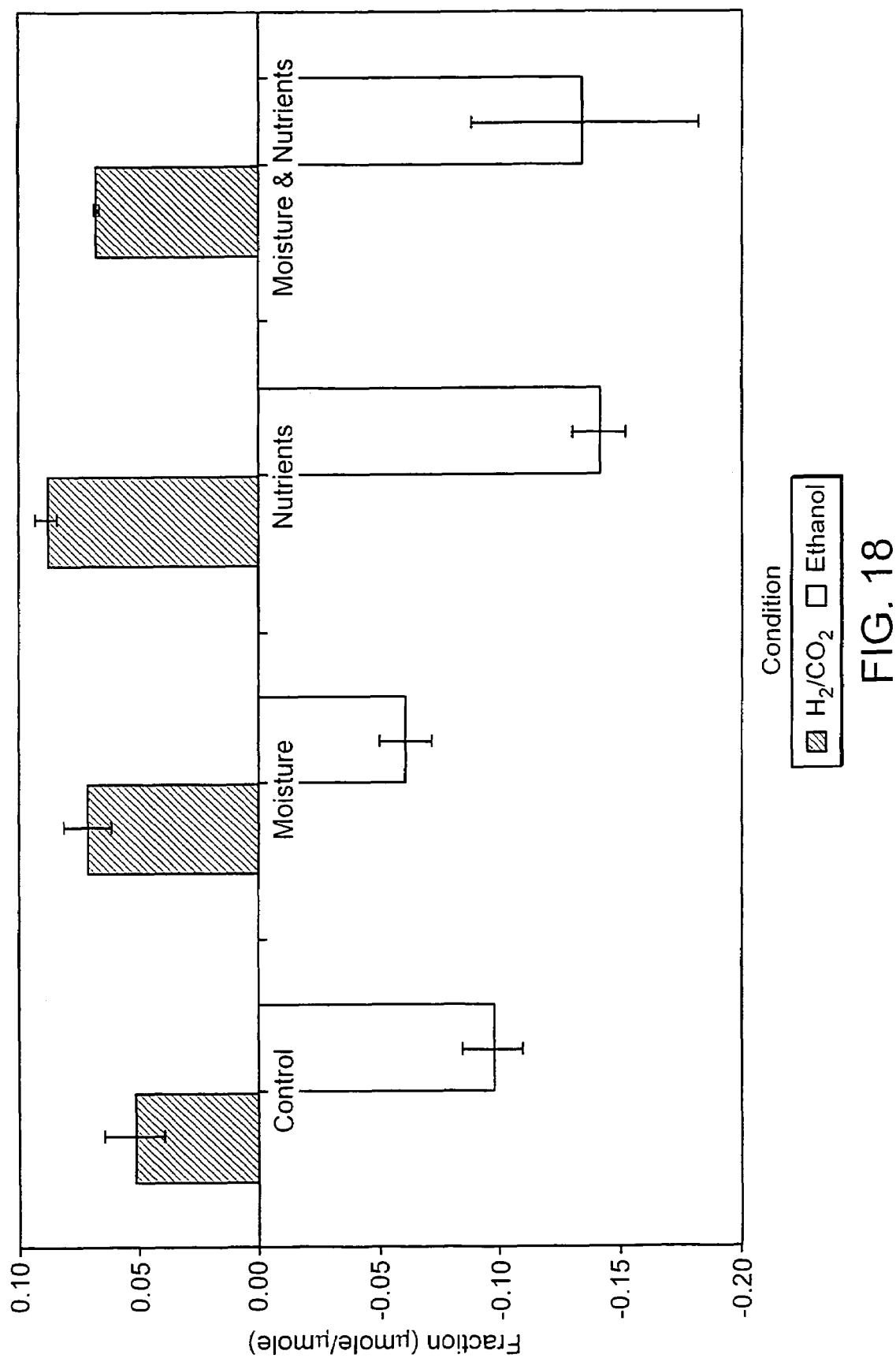
FIG. 18 illustrates a bar graph of an analysis of carbon dioxide production/consumption in terms of electron donor consumption.

FIG. 18 illustrates a bar graph of an analysis of carbon dioxide production/consumption in terms of electron donor consumption. From 0.051 to 0.087 moles of carbon dioxide were consumed per mole of hydrogen consumed. From 0.061 to 0.14 moles of carbon dioxide were produced per mole of ethanol consumed.

Figure 19:
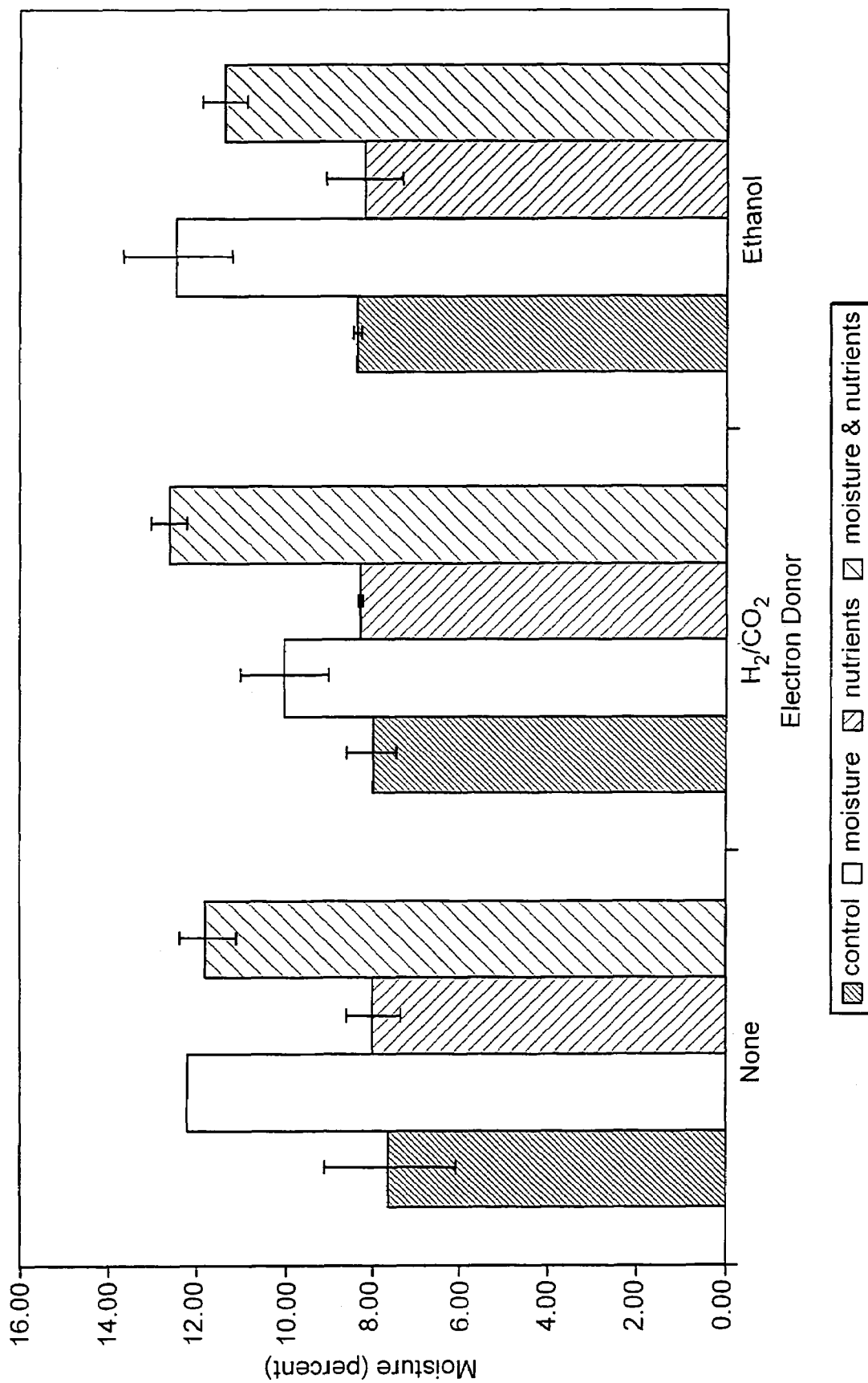
FIG. 19 illustrates a bar graph of final moisture content in testing vials.

FIG. 19 illustrates a bar graph of the final moisture content in the testing vials.

FIG. 20 illustrates a table of perchlorate removal under different electron donor and moisture conditions. Results are shown for 105 days of microcosm incubation. The results show that acetic acid, propionic acid, hydrogen/carbon dioxide, and ethanol promoted complete perchlorate removal. Greater reduction in perchlorate concentration was observed with increased moisture content; however, in the presence of ethanol, nearly complete perchlorate removal was observed in soils with the lower moisture content. In a separate experiment, perchlorate was removed using ethyl acetate as an electron donor within 8 weeks of incubation.

Figure 21:
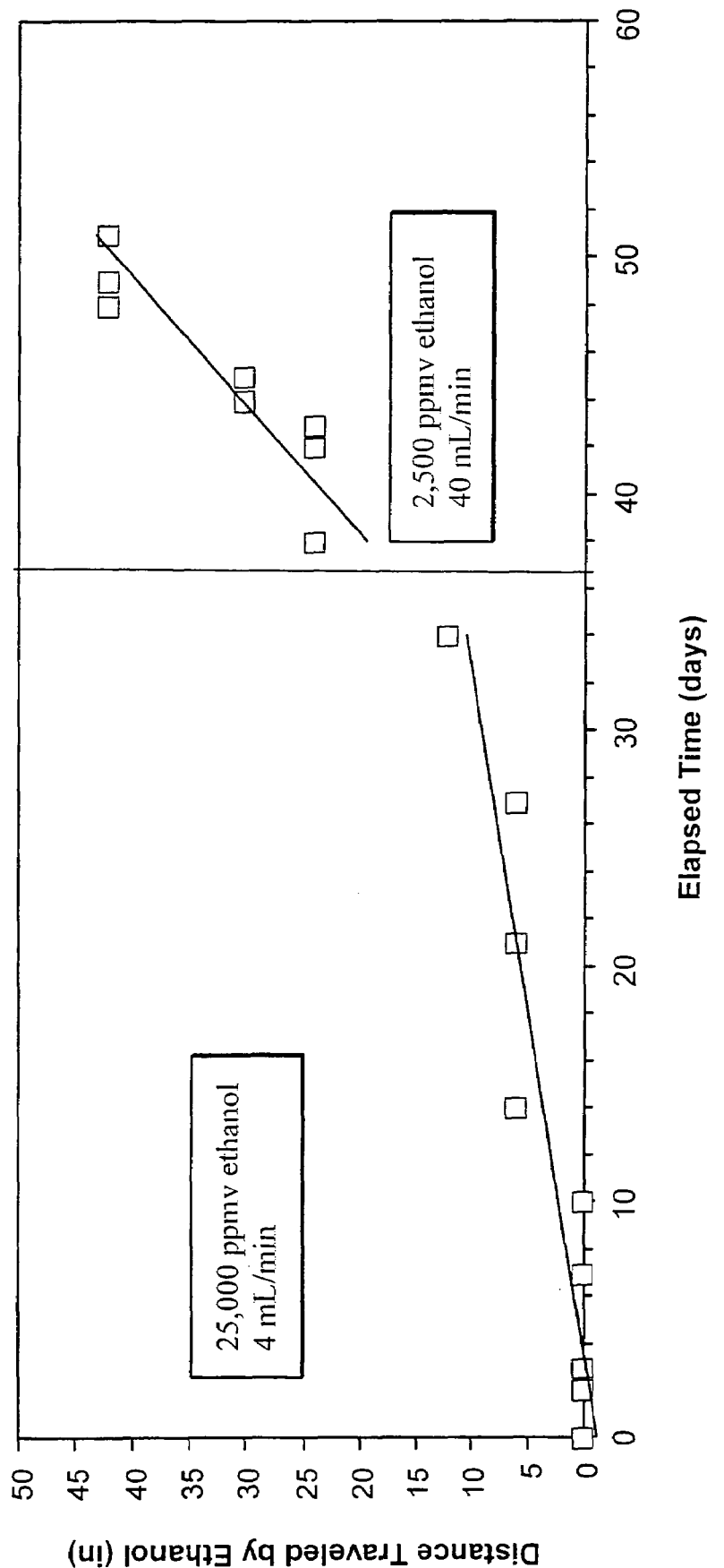
FIG. 21 illustrates a graph of ethanol transport through moist soil.

FIG. 21 illustrates a graph of ethanol transport through moist soil. These results show that ethanol vapor was transported slowly through a moist soil column. The rate of transport increased when the bulk gas velocity was increased and the ethanol mass delivery rate was kept constant. This data indicates that ethanol requires relatively high bulk gas velocities for effective transport in this particular soil.

Figure 22:
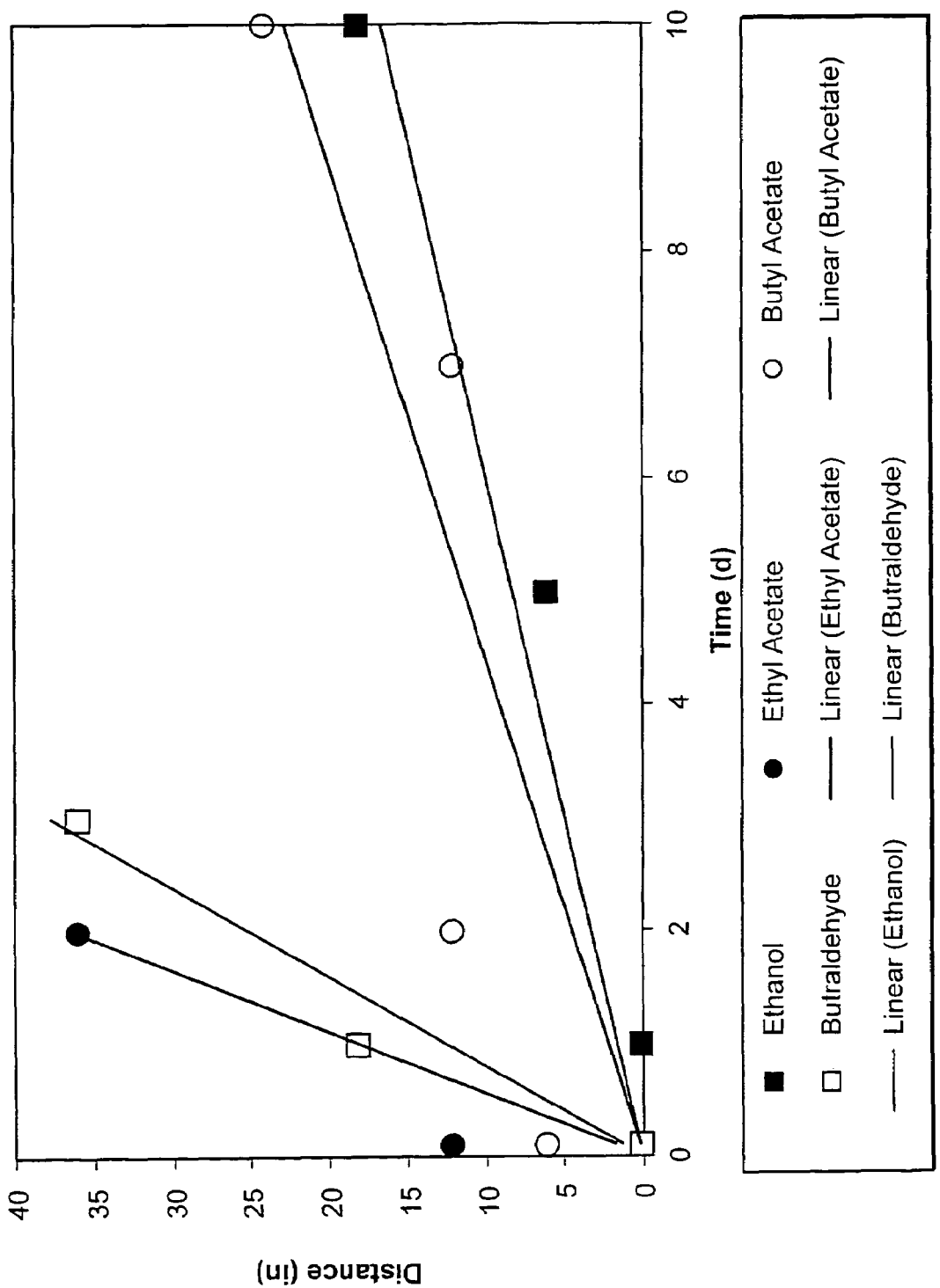
FIG. 22 illustrates a graph of four gaseous electron donors through moist soil.

FIG. 22 illustrates a graph of four gaseous electron donors through moist soil. These results were obtained from 5-feet long soil columns containing site soil with 10 percent moisture. Ethyl acetate and butyraldehyde were transported much more quickly than ethanol and butyl acetate.

FIG. 23 illustrates a table of gaseous electron donor physical properties and transport rates through moist soil. These results are based on the data presented in FIG. 22 and show that transport rates of ethyl acetate and butyraldehyde are greater than the transport rates of ethanol and butyl acetate. Table 23 also shows that the Henry's constants for ethyl acetate, butyl acetate, and butyraldehyde are similar to each other and greater than that of ethanol.

Figure 24:
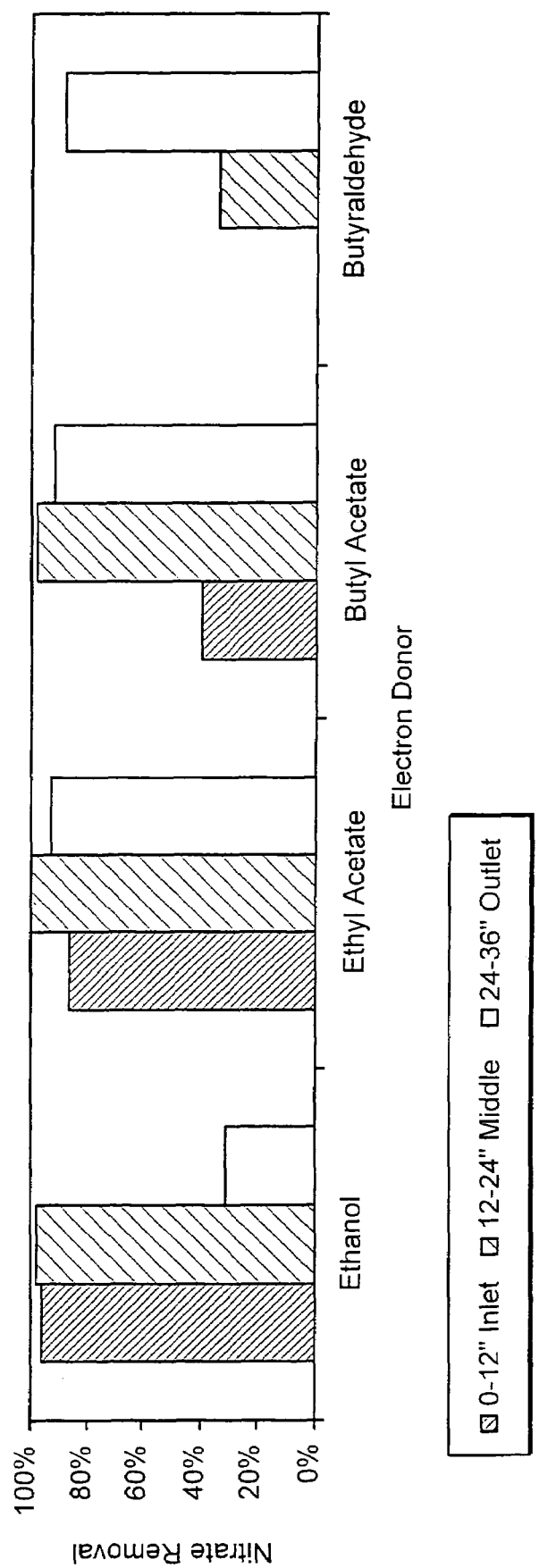
FIG. 24 illustrates a bar graph of nitrate biodegradation in moist soil following transport of various gaseous electron donors through the moist soil.

FIG. 24 illustrates a bar graph of nitrate biodegradation in moist soil following transport of various gaseous electron donors through the moist soil. These results show that only ethyl acetate promoted significant nitrate biodegradation in throughout the soil column. Ethanol was not effectively transported to the end of the column and thus nitrate removal in the 24-36" portion of the column (gas outlet) was not observed. Butyl acetate and butyraldehyde promoted nitrate biodegradation at the column outlet but not at the inlet. Insufficient electron donor was added to the columns to promote perchlorate biodegradation. Use of increased ethyl acetate concentrations is expected to result in perchlorate reduction in addition to nitrate reduction. These data support the practical utility of ethyl acetate as a gaseous electron donor.

These testing results are surprising and unexpected for several reasons. It was previously shown by Rainwater, et al. (supra) that both RDX and TNB were removed from soil using nitrogen gas alone. Surprisingly, however, several of the controls in the instant tests (e.g., those shown in FIGS. 3 and 4) showed that nitrogen and moisture (i.e., no gaseous electron donor) promoted partial removal of nitrate but no removal of the perchlorate. Thus the perchlorate contaminant behaved in an unexpected manner in that nitrogen alone did not promote its removal.

Also, the Henry's constant was expected to control transport of gaseous electron donors through moist soil. Ethyl acetate, however, was transported much more quickly than butyl acetate (as indicated in FIG. 23) even though these donors have similar Henry's constants. Thus ethyl acetate is a surprisingly favorable gaseous electron donor from the perspective of transport through moist soil.

The instant results also showed that ethyl acetate promoted biodegradation of nitrate throughout the entire soil column, while butyl acetate only promoted biodegradation of nitrate in the center and end of the soil column. These results are unexpected based on the teachings of Rainwater, et al. which showed that isobutyl acetate promoted TNB removal throughout the soil column. Furthermore, the fact that ethanol promoted nitrate removal in part of the soil column (as shown in FIG. 24) is unexpected based on the results presented by Rainwater, et al. which showed that ethanol did not promote removal of RDX or TNB when compared to the nitrogen-only control.

The instant test results also surprisingly show that ethyl acetate, ethanol, butyl acetate, and butyraldehyde all promoted nitrate removal albeit to varying extents as shown in FIG. 24. This result was unexpected based on the teachings of Rainwater, et al., which showed that only isobutyl acetate promoted TNB removal compared to the nitrogen-only control.

In summary, these tests show that gaseous electron donors are transported through soil in an unexpected manner that is not predicted by the Henry's constant and that gaseous electron donors surprisingly promote nitrate and perchlorate biodegradation in soil in an unexpected manner that is not predicted by transport or biodegradation data. The data presented in the instant example demonstrates that gaseous electron donor injection technology using various compounds can surprising promote the in situ biodegradation of multiple contaminants including perchlorate and nitrate.

What is claimed is:

1. A method of stimulating anaerobic degradation of subsurface contaminants, comprising the steps of:
    a) vaporizing a liquid electron donor to form an electron donor gas, wherein the electron donor is a liquid at a temperature of 0° C. and a pressure of 1 atmosphere;
    b) mixing the electron donor gas with a carrier gas to form a treating gas having an electron donor component; and
    c) directing the treating gas to a subsurface injection site that includes at least one perchlorate contaminant;
    wherein the treating gas stimulates anaerobic degradation of at least a portion of the perchlorate contaminant.

2. The method of claim 1, wherein the electron donor includes at least one member of the group consisting of an organic acid, an aldehyde, an amine, a ketone, and an ester.

3. The method of claim 1, wherein the electron donor includes at least one member of the group consisting of formic acid, acetic acid, propionic acid, butyric acid, and isomers thereof.

4. The method of claim 1, wherein the electron donor includes at least one member of the group consisting of dimethylamine, diethylamine, ethanolamine, and isomers thereof.

5. The method of claim 1, wherein the electron donor includes at least one member of the group consisting of acetone, methyl ethyl ketone, and ethyl vinyl ketone.

6. The method of claim 1, wherein the electron donor includes butyl acetate.

7. The method of claim 1, wherein the electron donor includes ethyl acetate.

8. The method of claim 1, wherein the electron donor includes an alkene.

9. The method of claim 1, wherein the electron donor includes at least one member of the group consisting of hexene, octene, isoprene, butadiene, and isomers thereof.

10. The method of claim 1, wherein the electron donor includes an alkyne.

11. The method of claim 1, wherein the electron donor includes an aromatic hydrocarbon.

12. The method of claim 1, wherein the electron donor includes at least one member of the group consisting of toluene, xylene, cumene, cymene, and isomers thereof.

13. The method of claim 1, wherein the electron donor includes at least one member of the group consisting of methanol, propanol, butanol, and isomers thereof.

14. The method of claim 1, wherein the electron donor includes ethanol.

15. The method of claim 1, wherein the electron donor is heated to form the electron donor gas.

16. The method of claim 1, further including the step of heating the carrier gas.

17. The method of claim 16, wherein the heated carrier gas is used to promote vaporization of the liquid electron donor.

18. The method of claim 1, wherein subsurface injection site includes groundwater.

19. The method of claim 18, wherein the subsurface injection site includes perched water.

20. The method of claim 1, wherein the subsurface injection site includes soil.

21. The method of claim 20, wherein the soil is in the vadose zone.

22. The method of claim 1, wherein the subsurface injection site is at least 5 feet below ground surface.

23. The method of claim 1, wherein the subsurface injection site is at least 20 feet below ground surface.

24. The method of claim 1, wherein the electron donor gas is directed to more than one subsurface injection site.

25. The method of claim 1, wherein the amount of electron donor gas mixed with the carrier gas is controlled to prevent condensation of the electron donor component from the treating gas.

26. The method of claim 1, further including a step of controlling the partial pressure of the electron donor component to prevent the partial pressure from exceeding the saturation vapor pressure of the electron donor at subsurface conditions, thereby preventing condensation of the electron donor component from the treating gas.

27. The method of claim 1, wherein the carrier gas includes at least one member of the group consisting of steam, air, carbon dioxide, nitrogen, argon, and gas extracted from the subsurface.

28. The method of claim 1, wherein the carrier gas is substantially devoid of oxygen.

29. The method of claim 1, wherein the carrier gas includes water vapor.

30. The method of claim 1, further including a step of directing water vapor to the subsurface site.

31. A method of stimulating anaerobic degradation of subsurface contaminants, comprising the steps of:
   a) vaporizing a liquid electron donor to form an electron donor gas, wherein the electron donor is a liquid at a temperature of 0° C. and a pressure of 1 atmosphere and includes at least one member selected from the group consisting of an aldehyde, an alkene, an alkyne, an amine, an aromatic hydrocarbon, an ester, a ketone, an organic acid, ethyl acetate, methanol, ethanol, propanol, butanol, and isomers thereof;
   b) mixing the electron donor gas with a carrier gas to form a treating gas having an electron donor component; and
   c) directing the treating gas to a subsurface injection site that includes at least one contaminant;
   wherein the treating gas stimulates anaerobic degradation of at least a portion of the contaminant.

32. The method of claim 31, wherein the contaminant is a nitrate compound.

33. The method of claim 31, wherein the contaminant is a perchlorate compound.

34. The method of claim 31, wherein the contaminant is a chlorinated compound.

35. The method of claim 31, wherein the contaminant is a halogenated organic compound.

36. The method of claim 31, wherein the electron donor includes at least one member of the group consisting of formic acid, acetic acid, propionic acid, butyric acid, and isomers thereof.

37. The method of claim 31, wherein the electron donor includes at least one member of the group consisting of dimethylamine, diethylamine, ethanolamine, and isomers thereof.

38. The method of claim 31, wherein the electron donor includes at least one member of the group consisting of acetone, methyl ethyl ketone, and ethyl vinyl ketone.

39. The method of claim 31, wherein the electron donor includes ethyl acetate.

40. The method of claim 31, wherein the electron donor includes at least one member of the group consisting of hexene, octene, isoprene, butadiene, and isomers thereof.

41. The method of claim 31, wherein the electron donor includes at least one member of the group consisting of toluene, xylene, cumene, cymene, and isomers thereof.

42. The method of claim 31, wherein the electron donor includes at least one member of the group consisting of methanol, propanol, butanol, and isomers thereof.

43. The method of claim 31, wherein the electron donor includes ethanol.

44. The method of claim 31, wherein the electron donor is heated to form the electron donor gas.

45. The method of claim 31, further including the step of heating the carrier gas.

46. The method of claim 45, wherein the heated carrier gas is used to promote vaporization of the liquid electron donor.

47. The method of claim 31, wherein subsurface injection site includes groundwater.

48. The method of claim 47, wherein the subsurface injection site includes perched water.

49. The method of claim 31, wherein the subsurface injection site includes soil.

50. The method of claim 49, wherein the soil is in the vadose zone.

51. The method of claim 31, wherein the subsurface injection site is at least 5 feet below ground surface.

52. The method of claim 31, wherein the subsurface injection site is at least 20 feet below ground surface.

53. The method of claim 31, wherein the electron donor gas is directed to more than one subsurface injection site.

54. The method of claim 31, wherein the amount of electron donor gas mixed with the carrier gas is controlled to prevent condensation of the electron donor component from the treating gas.

55. The method of claim 31, further including a step of controlling the partial pressure of the electron donor component to prevent the partial pressure from exceeding the saturation vapor pressure of the electron donor at subsurface conditions, thereby preventing condensation of the electron donor component from the treating gas.

56. The method of claim 31, wherein the carrier gas includes at least one member of the group consisting of steam, air, carbon dioxide, nitrogen, argon, and gas extracted from the subsurface.

57. The method of claim 31, wherein the carrier gas is substantially devoid of oxygen.

58. The method of claim 31, wherein the carrier gas includes water vapor.

59. The method of claim 31, further including a step of directing water vapor to the subsurface site.

60. A method for stimulating anaerobic degradation of subsurface perchlorate contaminants, comprising the step of directing hydrogen gas to a subsurface site, wherein the subsurface site includes at least one perchlorate contaminant and the hydrogen gas stimulates anaerobic degradation of at least a portion of the perchlorate contaminant.

61. The method of claim 60, further including the step of mixing the hydrogen gas with a carrier gas before it is directed to the subsurface site.

62. A method of stimulating anaerobic degradation of subsurface perchlorate contamination, comprising the steps of:
   a) vaporizing liquid ethanol to form ethanol gas;
   b) mixing the ethanol gas with a carrier gas to form a treating gas that includes from about 0.1% to about 2.5% ethanol gas by volume; and
   c) directing the treating gas to a subsurface injection site;
   wherein the subsurface injection site includes at least one perchlorate contaminant and the treating gas stimulates anaerobic degradation of at least a portion of the perchlorate contamination.

63. A method of stimulating anaerobic degradation of subsurface perchlorate contamination, comprising the steps of:
   a) vaporizing liquid methanol to form methanol gas;
   b) mixing the methanol gas with a carrier gas to form a treating gas that includes from about 0.1% to about 7% methanol gas by volume; and
   c) directing the treating gas to a subsurface injection site;
   wherein the subsurface injection site includes at least one perchlorate contaminant and the treating gas stimulates anaerobic degradation of at least a portion of the perchlorate contamination.

64. A method of stimulating anaerobic degradation of subsurface perchlorate contamination, comprising the steps of:
   a) vaporizing liquid ethyl acetate to form ethyl acetate gas;
   b) mixing the ethyl acetate gas with a carrier gas to form a treating gas that includes from about 0.1% to about 4% ethyl acetate gas by volume; and
   c) directing the treating gas to a subsurface injection site;
   wherein the subsurface injection site includes at least one perchlorate contaminant and the treating gas stimulates anaerobic degradation of at least a portion of the perchlorate contamination.

65. A method of stimulating anaerobic degradation of subsurface perchlorate contamination, comprising the steps of:
   a) vaporizing liquid hexene to form hexene gas;
   b) mixing the methanol gas with a carrier gas to form a treating gas that includes from about 0.1% to about 6.5% hexene gas by volume; and
   c) directing the treating gas to a subsurface injection site;
   wherein the subsurface injection site includes at least one perchlorate contaminant and the treating gas stimulates anaerobic degradation of at least a portion of the perchlorate contamination.

* * * * *